United States Patent [19]

Goto

[11] Patent Number: 5,182,551
[45] Date of Patent: Jan. 26, 1993

[54] REMOTE CONTROL SYSTEM FOR AUDIO/VIDEO DEVICES

[75] Inventor: Takeshi Goto, Hirakata, Japan

[73] Assignee: Matsushita Electric Industrial Co., Ltd., Osaka, Japan

[21] Appl. No.: 825,846

[22] Filed: Jan. 28, 1992

Related U.S. Application Data

[63] Continuation of Ser. No. 514,834, Apr. 26, 1990, abandoned.

[30] Foreign Application Priority Data

Apr. 27, 1989 [JP] Japan .................................. 1-108852
Dec. 20, 1989 [JP] Japan .................................. 1-330577

[51] Int. Cl.$^5$ .............................................. H04Q 1/00
[52] U.S. Cl. ........................ 340/825.24; 340/825.69; 340/825.72; 340/310 A; 341/176
[58] Field of Search ................ 340/825.24, 825.69, 340/825.72, 310 A; 341/176; 358/194.1; 455/603

[56] References Cited

U.S. PATENT DOCUMENTS

| | | | |
|---|---|---|---|
| 4,200,862 | 4/1980 | Campbell | 340/310 A |
| 4,337,480 | 6/1982 | Bourassin | 455/603 |
| 4,412,218 | 10/1983 | Niitsu . | |
| 4,418,333 | 11/1983 | Schwarzbach et al. | 340/310 A |
| 4,626,847 | 12/1986 | Zato | 340/825.24 |
| 4,718,112 | 1/1988 | Shinoda | 358/194.1 |
| 4,745,397 | 5/1988 | Lagerbauer et al. | 358/194.1 |
| 4,754,255 | 6/1988 | Sanders et al. | 340/825.69 |
| 4,817,203 | 2/1989 | Tsurumoto | 455/603 |
| 4,866,434 | 9/1989 | Keenan | 340/825.69 |
| 4,878,055 | 10/1989 | Kasahara | 340/825.72 |
| 4,885,803 | 12/1989 | Hermann et al. | 358/194.1 |
| 4,912,463 | 3/1990 | Li | 340/825.69 |

FOREIGN PATENT DOCUMENTS

0223311A2 5/1987 European Pat. Off. .
3106427A1 4/1982 Fed. Rep. of Germany .
2197104A 5/1988 United Kingdom .

OTHER PUBLICATIONS

Funkschau, No. 17, 1987, Munich, Herbert Hafner "Von der Fernbedienung zur Lernbedienung" pp. 20-24.

Primary Examiner—Donald J. Yusko
Assistant Examiner—Brian Zimmerman
Attorney, Agent, or Firm—Wenderoth, Lind & Ponack

[57] ABSTRACT

By the determination of the controlled device on a reception side of the remote control apparatus, all the devices connected to the system may be controlled by the transmitter of one unit of the remote control apparatus, and they also may be controlled by the transmitter of an already existing remote control apparatus even when a new device has been additionally connected to the system.

8 Claims, 24 Drawing Sheets

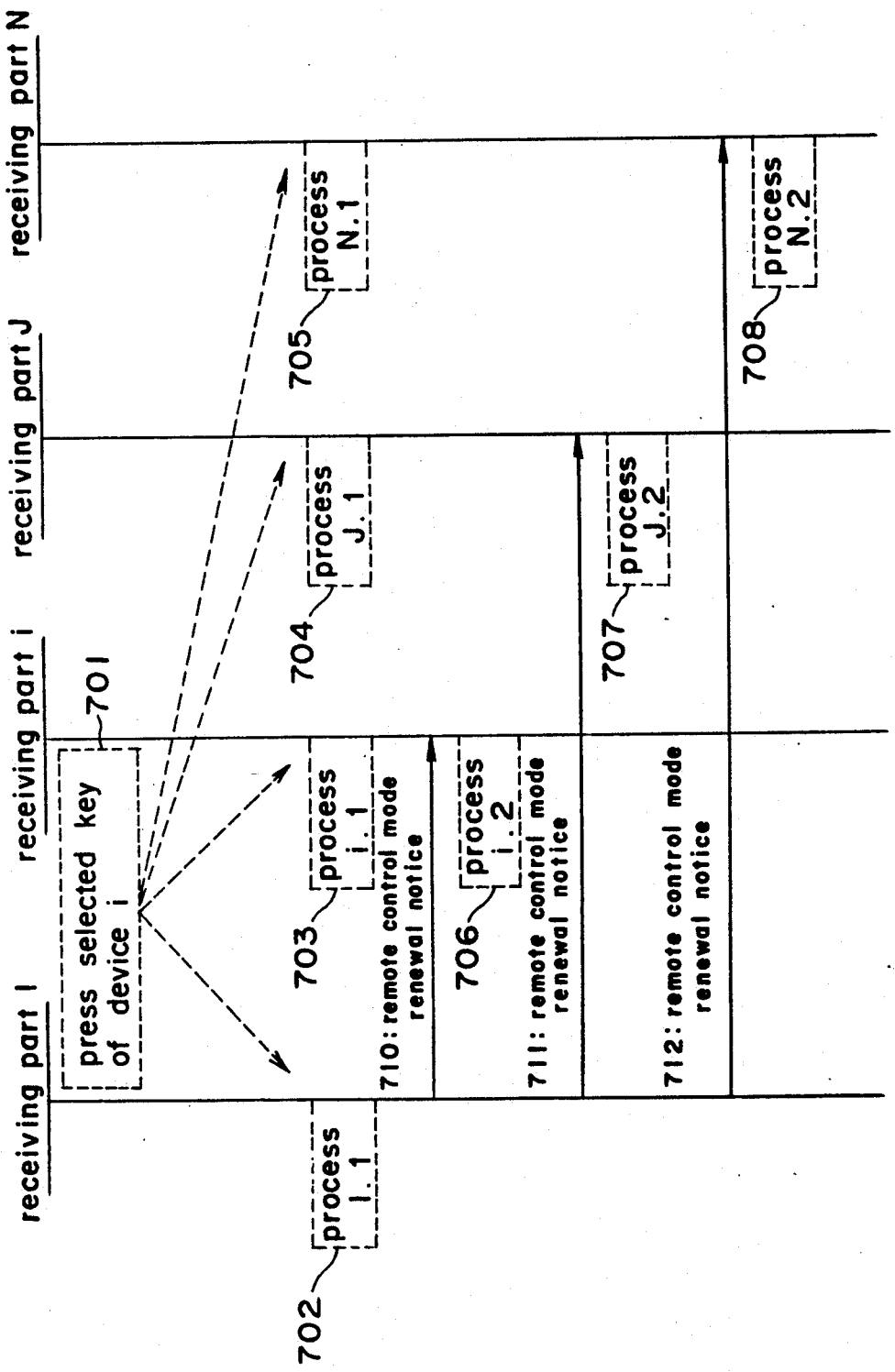

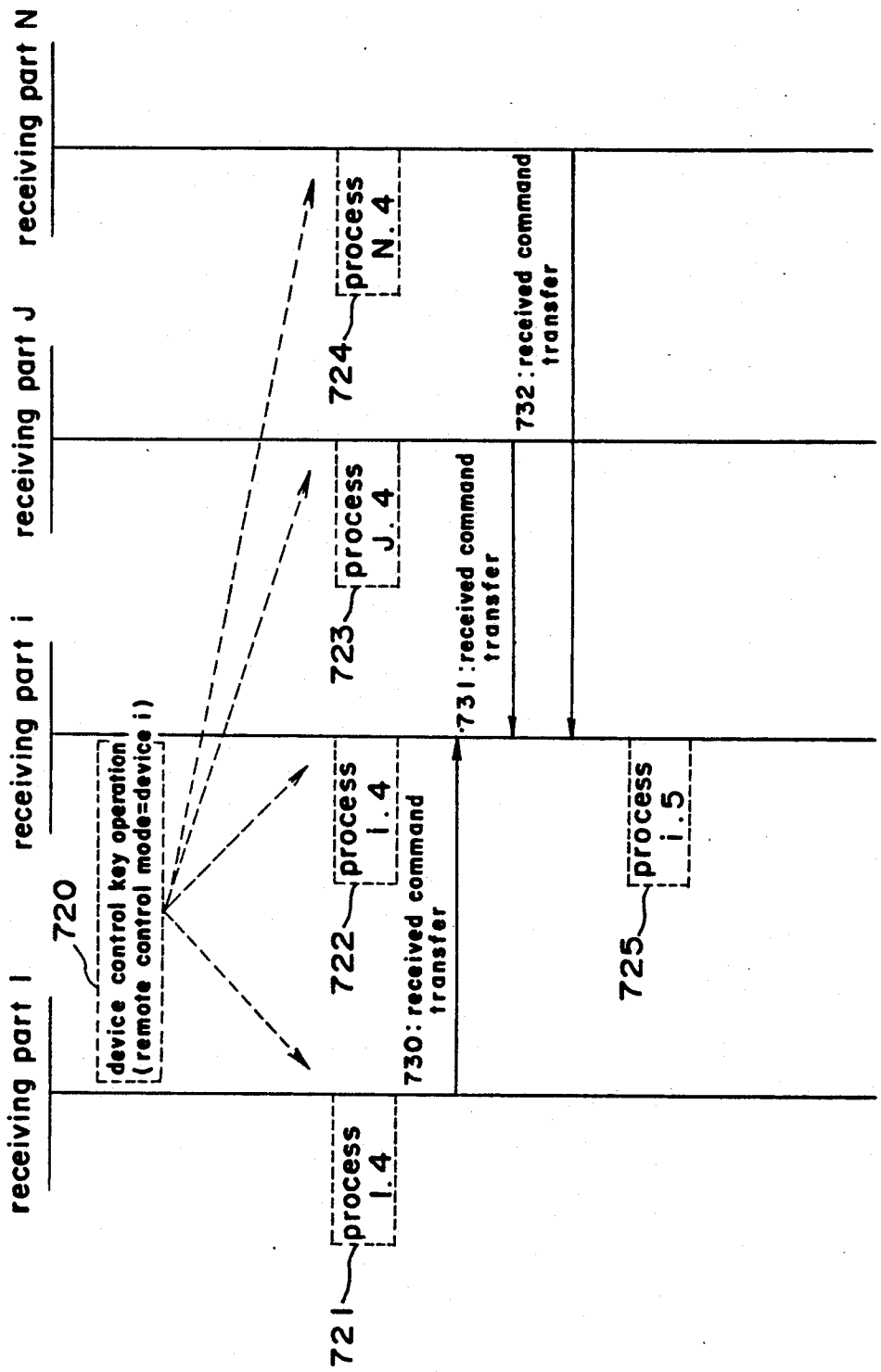

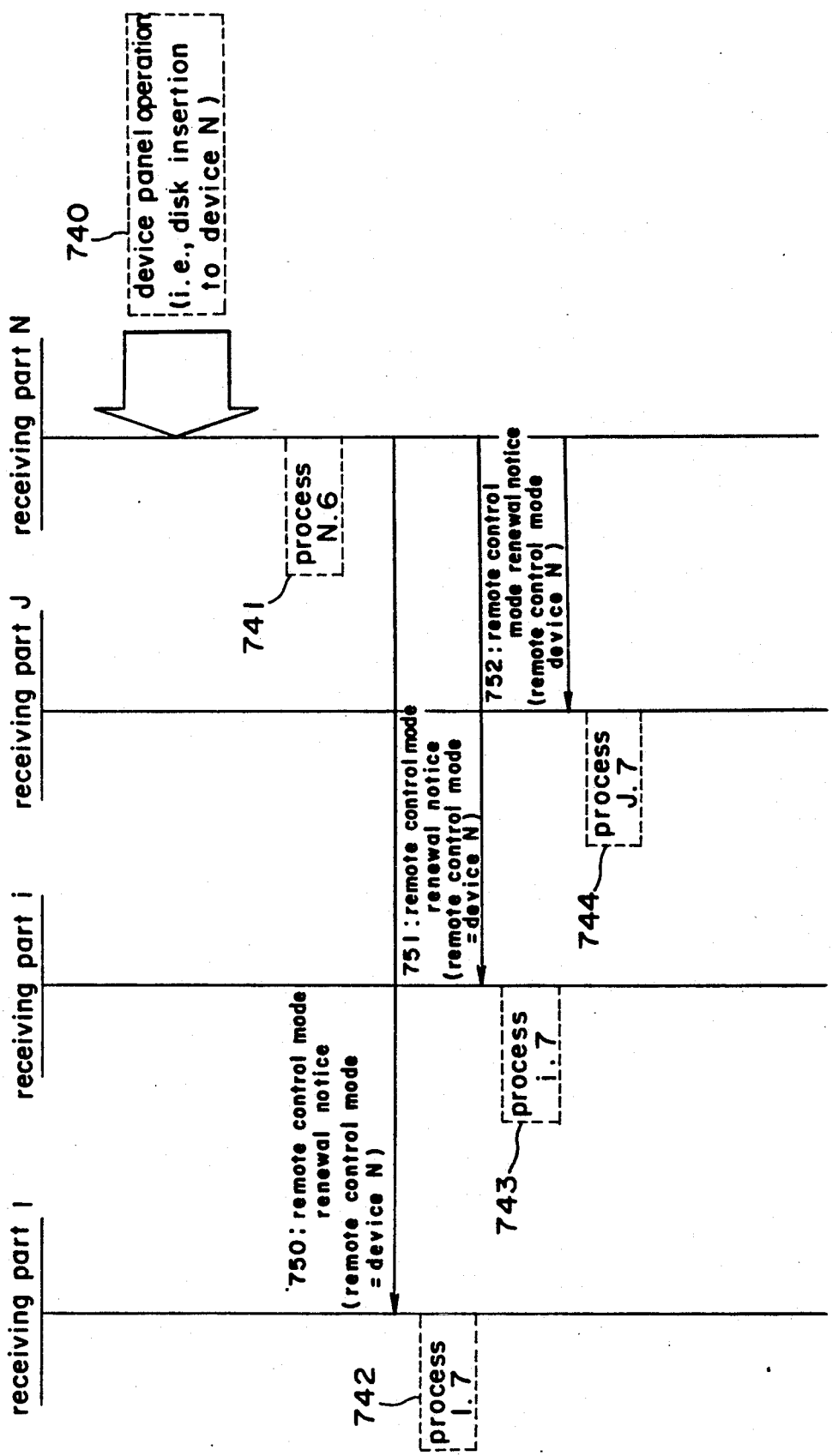

Fig. 10(1)
example 1 of remote control format (format of A company)

| 2301 | 2302 | 2303 | 2304 | 2305 | 2306 | 2307 |
|---|---|---|---|---|---|---|
| header | device code 5bits | data code 6bits | data code inversion bit 5bits | device code inversion bit 6bits | check bit 1bit | trailer |

Fig. 10(2)
example 2 of remote control format (format of B association)

| 2311 | 2312 | 2313 | 2314 | 2315 | 2316 | 2317 |
|---|---|---|---|---|---|---|
| header | maker code 16bits | parity 4bits | device code 12bits | command/data code 8bits × n bytes | parity 8bits | trailer |

Fig. 10(3)
format example on information transmission path

| 1112 | 1113 | 1115 | 1118 | 1129 |
|---|---|---|---|---|
| mode bit | master address | slave address | control code | message field |

Fig. 10(4)
data field content example of format on information transmission path

| 2331 | 2332 | 2333 | 2334 | 2335 | 2336 | 2337 |
|---|---|---|---|---|---|---|
| <BEGIN> | OPR of <BEGIN> | SSDA | DSDA | OPC | OPR | <END> |

Fig. 10(5)
data field content example of format on information transmission path

| 2341 | 2342 | 2343 |
|---|---|---|
| kinds of data | kinds of formats | remote control signal data after conversion of format |

Fig. 11(a) header
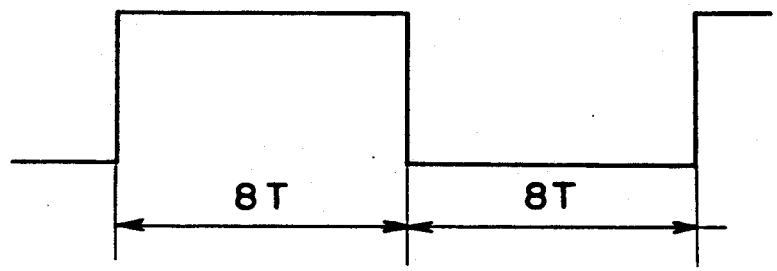
T: unit time
Fig. 11(b) bit "0"
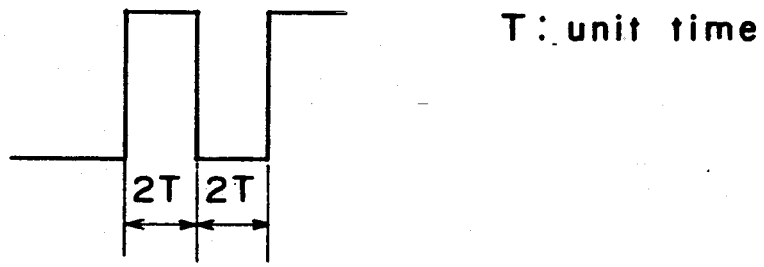
Fig. 11(c) bit "1"
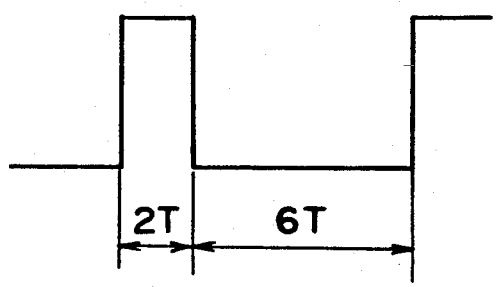

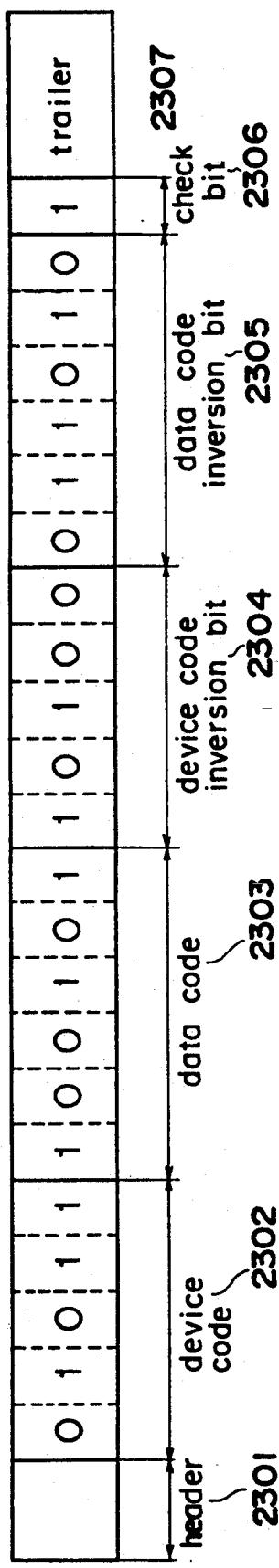
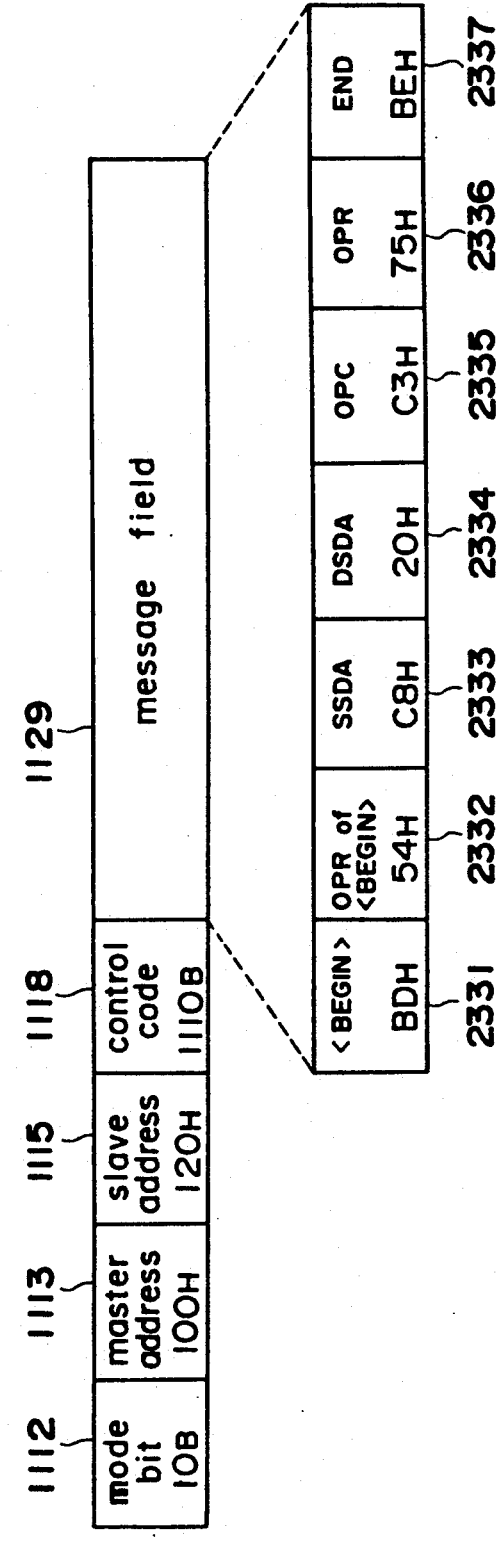

step 1: transfer data extracting step 2: dividing into 8 bit unit step 3: dummy bit adding    2350 dummy bit step 4: adding of data kinds, format kinds step 5: frame forming note: For brevity's sake, words "parity", "ACK", "end of data" are omitted.

Fig. 17

| device address 1 | maker code 1 |
|---|---|
| device address 2 | maker code 2 |
| ⋮ | ⋮ |
| device address n | maker code n |

143 address table

REMOTE CONTROL SYSTEM FOR AUDIO/VIDEO DEVICES

This application is a continuation of now abandoned application Ser. No. 07/514,834 filed on Apr. 26, 1990.

BACKGROUND OF THE INVENTION

The present invention generally relates to an apparatus for remote-controlling a plurality of stations (mainly audio/video devices) connected to information transmission path using infrared rays, for example, and a method of remote-controlling them.

DESCRIPTION OF THE PRIOR ART

Conventionally when a plurality of stations connected to an information transmission path are remotely controlled using infrared rays, for example, the following prior art techniques were used.

(1) The controlled device was determined in advance on the side of the transmitter. The transmitter transferred with respect to the remote control receiver the data including a code for specifying the controlled device.

(2) The respective stations effected the individual controlling operations by the use of the remote control data code string of a decodable code system;

(3) When a plurality of maker manufactured stations were controlled by a set of remote control transmitters, remote control codes of the other makers caused the remote control transmitter to learn them (remote control with a learning function attached to it: learning remote control) so as to effect the coping operation.

(4) A remote controlling apparatus which had a specific code system of the whole system connected by the information transmission path was used to effect the controlling operation of the respective stations.

(5) The data was discarded without any processing operation even if the remote control data code string addressed to the station of the other types were received by the remote control signal reception part of a certain station.

There were such problems as described hereinafter in the conventional prior art techniques described as described hereinabove.

(1) Since the type of the controlled devices was limited by the function on the side of the transmitter, expansion was difficult, so that the coping operation could not be effected when a new device has been added into a certain system.

(2) The general - J remote control (a plurality of types of stations: for example, the remote control which could control both the television and the VTR) transmitter basically could control only the stations manufactured by the same maker.

(3) When the learning remote control put into practical use in recent years (remote control which could learn the remote control signals of the stations of the other makers and the other types) was used, the stations manufactured by the different makers could be controlled, but the operation of learning the remote control signals for the station control use of the other makers were required, with a difficulty that the operation was hard to effect to those who did not know the mechanism. Also, since the remote control signals of the other makers were backed up in memory with a battery, there were cases where the battery was consumed when the remote control was left as it was without being used for a long period of time, and the contents were naturally erased so that the learning operation was required to be effected again.

(4) When a plurality of stations were controlled by the use of the conventional - J remote control and learning remote, the remote control signals were required to be transmitted towards the remote control light receiving part of the respective stations which became the control objects, so that the controlling operation could not be effected if an obstacle existed before the station which became the control target.

(5) When the respective stations were controlled by the use of the remote control apparatus which had a code system for the specified use of the whole system connected with the information transmission path, the remote control accompanied conventionally by each station could be used only for the station concerned, so that a new remote control transmitter for the exclusive use of the system was required to be purchased for the controlling of the other station by a set of remote transmitters.

SUMMARY OF THE INVENTION

Accordingly, an essential object of the present invention is to provide a system which is capable of controlling a plurality of stations connected to the information transmission path by one set of remote control apparatus transmitter.

Another important object of the present invention is to provide a remote control system with an expansion capability so that the controlling operation may be effected by the same remote control transmitter even when a new station has been additionally connected to a system composed of a plurality of stations connected to the information transmission path.

In accomplishing these and other objects, the present invention is chiefly composed of two inventions.

The first invention is provided to introduce a concept called a "remote control mode" into the remote control system. The "remote control mode" is information showing which station in the system is to be controlled at present. The remote control reception part receives the control signal which does not have the information as to which station to be controlled from the remote control transmitter so as to transfer the control signal into the station specified by the remote control mode the reception part stores. The remote control mode may effect a renewing operation by a signal for the remote control mode renewal sent from the remote control transmitter or a remote control mode renewal notice frame sent from the other station by way of the information transmission path.

In the conventional remote control system, a device to be controlled is already determined on the side of the remote control transmitter. The system is that the data code for the determined device is transmitted by the infrared rays so as to operate the device. In the remote control system of the present invention, a device (for example, a video cassette tape is inserted into a VTR) which has been operated immediately before a controlling key of the remote control transmitter is operated or a device selected by the depression of device selection keys (broadcast media selection key, deck player selection key) of the remote control transmitter is controlled. In order to realize the operation, a function of transmitting the data code of the contents depending only on the depressed key from the remote control transmitter is provided. The information as to which device to be controlled is not given to the data code string to be sent from the remote control transmitter.

In the remote control apparatus reception part, a remote control mode having the information of a device to be controlled at present is stored so as to control which device the control information coming from the remote control transmitter is to be transferred to by way of the information transmission path. Also, in the remote control mode, the renewing operation may be effected by the data code string from the remote control transmitter and the remote control mode renewal notice frame from the other device by way of the information transmission path.

The second invention is provided so as to transfer the remote control signal the remote control reception part received into the other station by way of the information transmission path.

The receiver of the remote control apparatus of the present invention demodulates the remote control data code string received from the remote control transmitter so as to decode it. As a result, if the controlled station is its own station in a case where the remote control data format is a format in which the contents may be decoded even if the remote control data format is of its own company or of the other company, the corresponding controlling operation is effected. If the controlled station is the other one, the corresponding control content is converted into the standard command to compose the frame so as to send it to the controlled station by way of the information transmission pass. If the infrared signal of the remote control data code string sent from the remote control transmitter does not reach directly to the station the user wants to control, it is possible to effect the controlling operation.

Since the control contents are converted into the standard command and are sent in the sending operation as the information transmission path, the controlling operation may be controlled if the controlled station is the station made by the other company which cannot decode the remote control data code string sent from the remote control transmitter.

But the remote control signal transfer method of the present invention has problems as follows.

1) The remote control transmitter and the remote control reception part are required to be made by the same maker, or the remote control reception part is required to decode the data code string transmitted from the remote control transmitter.

2) Only a function with the standard command of the communication system existing therein may be transferred to the other station.

A method for solving these problems is a remote control signal transferring method described below.

The receiver of the remote control apparatus of another embodiment of the present invention demodulates the remote control data code string transmitted from the remote control transmitting machine and light-received by the light receiving means and tries to decode the code by the data code processing means. The format conversion is effected so that the data code string of the remote control signal received may be transferred in a case where it was impossible to effect the decoding operation (when the remote control signal of the other maker has been received, when the signal with the content being not registered in it has been received, and so on if the signal is the remote control signal of its own company) so as to send it to all the stations connected to the information transmission pass by way of the information transmission pass with the information showing the type of the format of the remote control signal and the data code string of the remote control signal being provided as the data frame. When the received infrared ray remote control signal is of a business standard format (Household Electric Product Association format) in Japan, the transfer destination of the data frame is restricted so as to send onto the information transfer pass by the use of the remote control signal transfer method of the present invention, because the maker code is defined on the infrared remote control signal.

Each station which has received the frame transferred by the method decodes the reception data by the use of the remote control method of the present invention so as to control the station by the given processing operation. As the result, when the station which has received the remote control data code string sent from the remote control transmitter cannot decode the contents or when the standard command does not exist if the content can be decoded, the transmission transferring operation is effected to the other station by way of the information transmission path, so that the user may control the desired station.

BRIEF DESCRIPTION OF THE DRAWINGS

These and other objects and features of the present invention will become apparent from the following description taken in conjunction with the preferred embodiment thereof with reference to the accompanying drawings, in which;

FIG. 7 (a) is a sequence chart of the device selection key processing of the remote control method;

FIG. 7 (b) is a sequence chart of the device control key operation processing of the remote control method;

FIG. 7 (c) is a sequence chart of a device panel operation processing of the remote control method;

FIGS. 10(1)-10(5) are model charts in one example of the format of the remote control data and the data transmitting on the information transmission pass;

FIGS. 11(a)-11(c) are model charts showing the construction of an infrared ray remote control signal;

FIGS. 13(1)-13(2) are model chart showing a data conversion example in a case where the remote control signal transfer method described in the present application has been applied;

FIG. 17 is a model chart showing one example of a station address table used in the remote control signal transfer described in the present application;

DETAILED DESCRIPTION OF THE INVENTION

Figure 1:
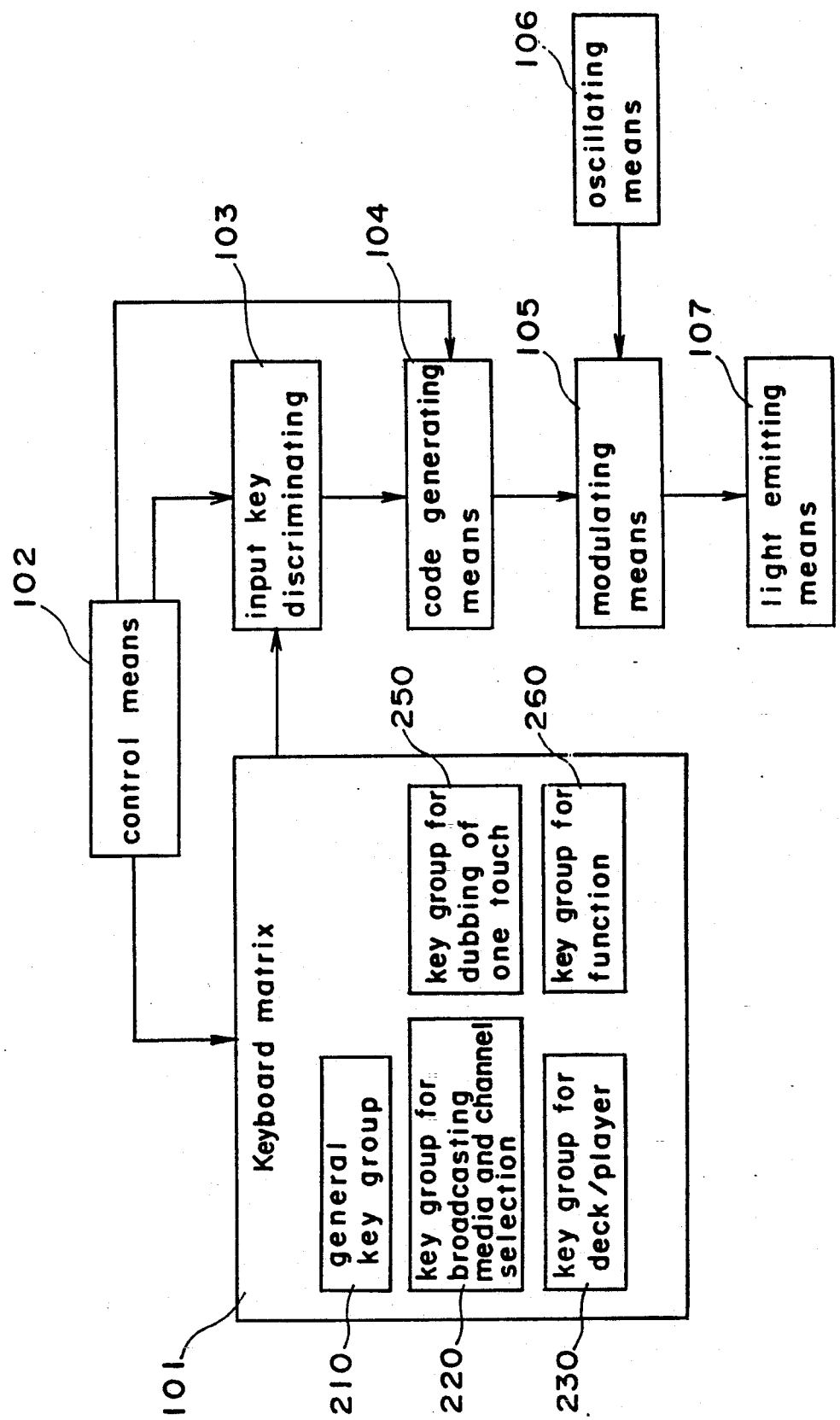
FIG. 1 is a block diagram of a remote control apparatus transmitter described in the present application.

Before the description of the present invention proceeds, it is to be noted that like parts are designated by like reference numerals throughout the accompanying drawings.

One preferred embodiment of the present invention will be described hereinafter in detail with reference to the drawings.

Section 1. Summary Description of the System (a) Definition

The system described here is an audio video system with an audio video device constructed mainly as a station. The audio video system is composed of an audio video device group which is connected mutually by a communication system provided with a transmission property and a code independence property. The information is transmitted as a unit of variable length called a frame. A physical mechanism which transmits and receives the information is called a communication control apparatus (which is called a communication control part in a case where it is built-in in the audio video device). A communication circuit which is adapted to carry the information from a certain communication control apparatus to the other communication control apparatus. The basic terms necessary enough to understand the following portions of the present specification will be briefly described with reference to FIGS. 21 and 22.

Station 1002 through 1005: A device which is connected to the information transmission path 1001 and has a data communication function with the other station.

Master: A station which has a control right of the communication system.

Slave: A station which is specified by the master and has a duty to answer with respect to the master.

Transmitter: A station which the data placed within the message field in the frame.

Receiver: A station which is adapted to receive the data placed within the message field in the frame.

Light sequence: A sequence which is adapted to transmit the command and the data with respect to the slave with the master becoming the transmitter. There are two types: a light command sequence and a light data sequence.

Lead sequence: A sequence of collecting the data from the slave with the master becoming the receiver.

Frame 110: A unit of the information to be transmitted from a certain station to the other station. This is composed of a header field, a master field, a slave field, a control field, and a message field.

Command frame: A frame with the contents of the message field being composed of a command.

Data frame: A frame with the contents of the message field being composed of data.

Command: A data code string to be transferred by the command frame. The processing contents for the station, which has received it, to carry out are unificatively defined with the whole system. The processing contents for the station, which has received the data, to carry out depend upon the station which has received it.

Mode bit 1112: This effects a distinguishing operation of the transfer speed of the frame and the number of transferable bytes of the messages.

Header field 1125: A region where the instructions of the start of the frame and the discrimination of the mode of the frame are effected.

Master field 1126: A region where the address of the master is presented.

Slave field 1127: A region for presenting the address of the slave. It is specified by the master.

Control field 1128: A region where the meaning of a transmission direction of the message field in the frame, of the contents described in the message field, and the lock controlling operation are effected.

Message field 1129: This is a data region where the message is transmitted. In this region, it is possible to continuously transfer a plurality of blocks with eight bits of data bit 1121, one bit of end of data bit 1122, one bit of parity bit 1123, and one bit of ACK bit 1124 being provided as one block.

Arbitration: A collision control for determining a priority right in a case where a plurality of stations have tried the transmission start of the frame at the same time. It is carried out during the periods of the header field 1125 and the master field 1126.

Lock control: This is a function with which the master specifies with respect to the slave. Once the slave is locked, the frame of such contents as change the condition of the slave from the other master can be received no longer before the locking is released.

Remote control data code string: A data code string showing which key of the remote control transmitter has been depressed.

(b) Basic construction of the system

Figure 21:
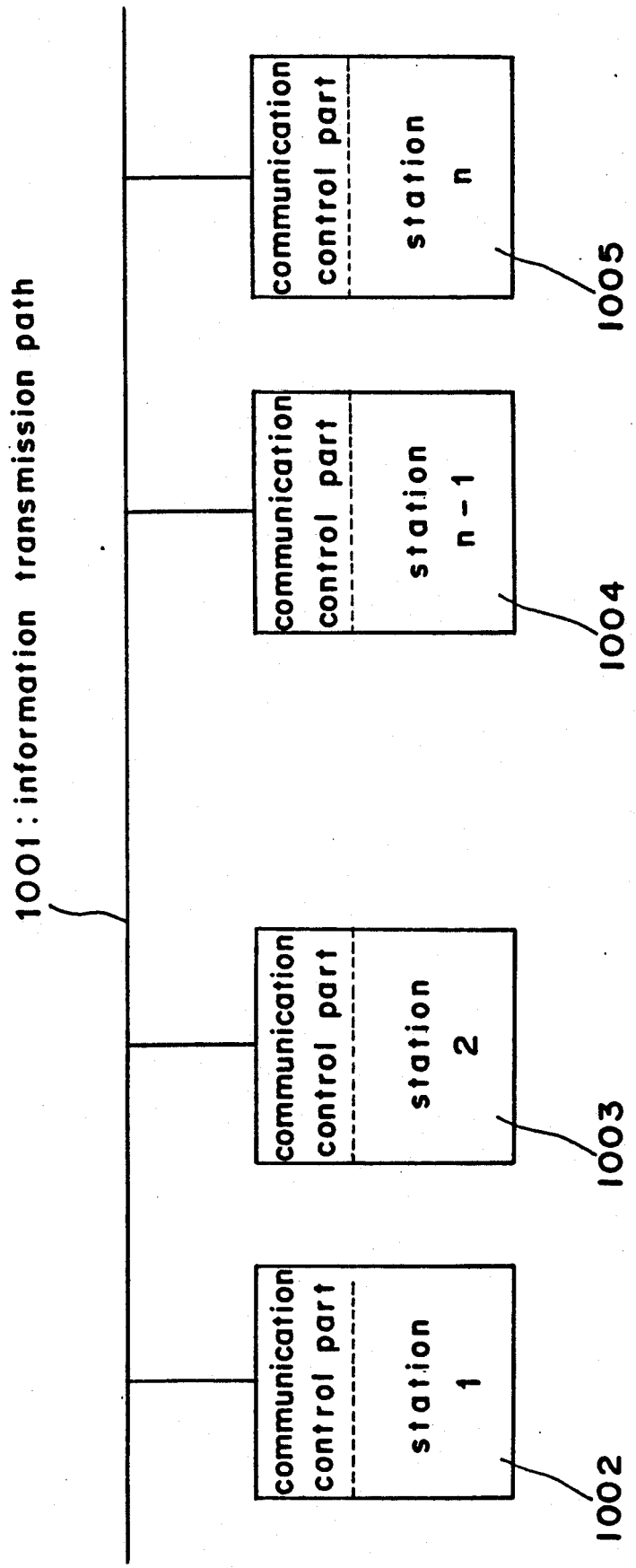
FIG. 21 is a model chart showing the basic construction of a communication system to which the present invention is applied.

FIG. 21 shows the basic construction of the audio video system to which the present invention has been applied. The information transmission path 1001 of one system has a plurality of stations 1002, 1003, ..., 1005, which are provided with a communication control part, connected with respect to one another. Each station has audio video devices and so on such as VTR, TV, CD player and so on provided as centers. No problems are caused if the station except for audio video device such as telecontrol apparatus or the like for controlling the audio video system is connected. Also, the system has no central control apparatus which is adapted to control the whole operations concentratedly.

(c) Frame form and basic communication procedure

Figure 22:
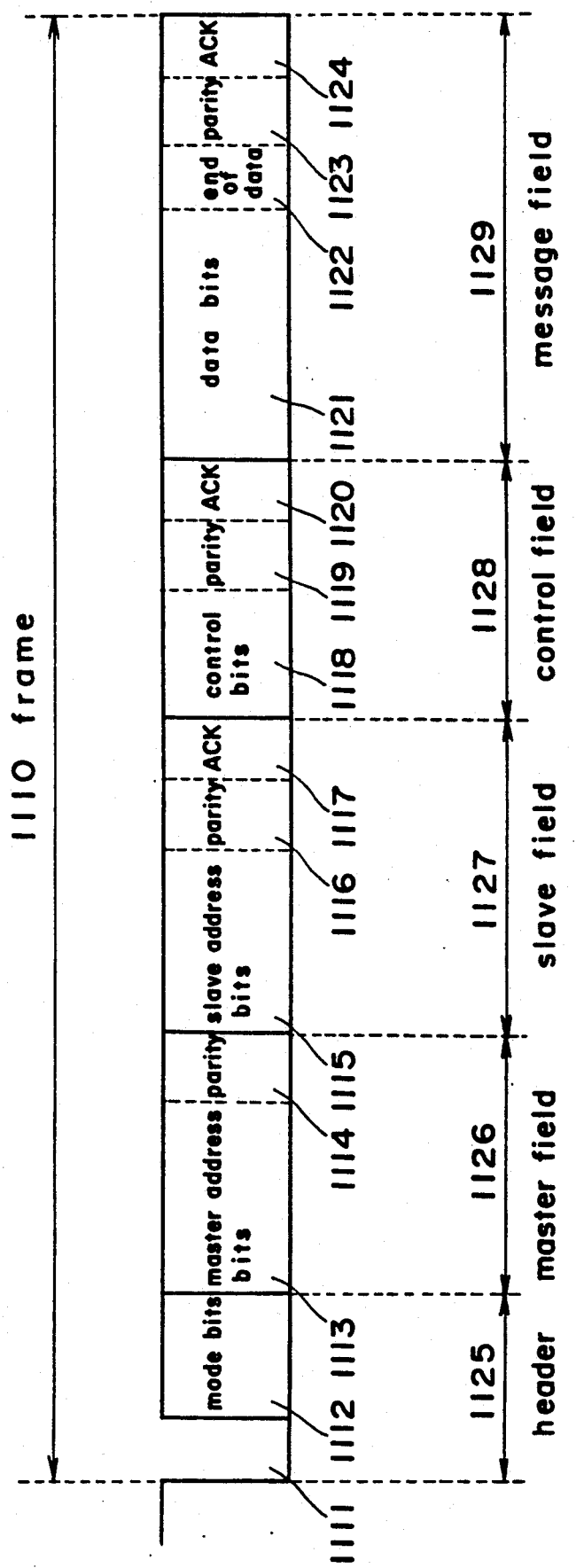
FIG. 22 is a model chart showing the frame to be used in the communication system to which the present invention is applied.

In the embodiment of the present invention, an internal standard norm defined by the document [84(Secretariat)86 I, II Draft—Domestic digital Bus] (hereinafter referred to as [84(Secretariat)86 I, II Draft—Domestic digital Bus] issued by the [International Electrotechnical Commission] is applied as one example. In this paragraph, the frame form and the basic communication procedure which are defined in the international standard norm will be described. The construction of the frame is shown in FIG. 22. The frame 1110 is composed of a header 1125, a master field 1126, a slave field 1127, a control field 1128, and a message field 1129. The header 1125 is composed of a start bit 1 showing the start of the frame and a mode bit 1112 for transferring the mode. The master field 1126 is composed of a 12 bits of master address bit 1113 and a 1 bit of parity bit 1114. The slave field 1127 is composed of a 12 bits of slave address bit 1115, a 1 bit of parity bit 1116 and a 1 bit of ACK bit 1117. When the station specified into the slave exists, there is a duty for returning the affirmative reply with respect to the master by the ACK bit 1117 of the slave field.

The construction method of the master address bit 1113 and the slave address bit 1115 are common, with the most significant 4 bits being of a service type, the intermediate significant 5 bits being of a device type, and the least significant 3 bits being of a device numeral. In the [84(Secretariat)86 I, II draft—Domestic digital Bus], the <AVC service> only is defined as the service type with the value thereof being "0001". In the device type, the type of the various AV devices is assigned, and some of the assignments are shown in Table 1. The device numeral discriminates among the device types when the same device type exists in the same communication system of a plurality of sets. Generally the device types are sequentially assigned from the "000".

TABLE 1

| | Device Type |
|---|---|
| 00000 | VIDEO MONITOR |
| 00001 | AUDIO AMPLIFIER |
| 00010 | SWITCH BOX |
| 00011 | not defined |
| 00100 | VIDEO TAPE RECORDER |
| 00101 | VIDEO TUNING SYSTEM |
| 00110 | VIDEO DISK PLAYER |
| 00111 | CAMERA |
| . | |
| . | |

The master continuously transfers the roll field 1128 and its subsequent when it has received the affirmative answer by the ACK bit 1117. The master suspends the transfer of the frame when the negative reply has been received. The control field 1128 is composed of a 4 bits of control bit 1118, a 1 bit of parity bit 1119 and a 1 bit of ACK BIT 1120. The control bit 1118 is a region where the meaning of the transfer direction of the message field 1129 in the frame, of the contents described in the message field, and the lock controlling operation are effected. The contents of the control field are shown in Table 2.

TABLE 2

| HEX | Contents of CF | Lock Function |
|---|---|---|
| 0 | read slave status | not locked |
| 1 | not defined | |
| 2 | read slave status | lock |
| 3 | read data | lock |
| 4 | read lock address (M, L) | not locked |
| 5 | read lock address (H) | not locked |
| 6 | read slave status | unlock |
| 7 | read data | unlock |
| 8 | write memory address | lock |
| 9 | not defined | |
| A | write command | lock |
| B | write data | lock |
| C | not defined | |
| D | not defined | |
| E | write command | unlock |
| F | write data | unlock |

The slave returns the affirmative reply to the master by the ACK bit 1120 when the control of the contents specified by the control bit 1118 is acceptable. The slave returns the negative reply when the control thereof is not acceptable. The master advances to the region of the message field 1129 after the master has received the affirmative reply by the ACK bit 1120. When the master has received the negative replay, it suspends the transfer of the frame. The message field 129 is composed of a plurality of blocks, with the block being composed of a 8 bit of data bit 1121, a 1 bit of end of data bit 1122 showing the final data bit of the message field, a 1 bit of parity bit 1123 and a 1 bit of ACK BIT 1124. The station specified as the receiver by the control bit 1118 returns to the transmitter the affirmative reply or the negative replay with the ACK bit 1124 every time the data bit 1122 is received by 1 byte. The transmitter which has received the negative reply suspends the transferring operation of the message field in that place.

In this system, all the stations 1002 through 1005 have a right to become the master, and may specify the slave to control the transmission start of the frame 1110 and the transmission timing. Although all the stations 1002 through 1005 have a right to become the master so as to start the transmission of the frame 1110, the information transmission pass 1001 can be monopolized only by one master at a time. Therefore, when a plurality of masters have tried to transmit the frame at the same time, the arbitrating operation is necessary to be effected to decide the priority right. The slave has a duty to return a reply (ACK bit) with respect to the master by one unit of station address-specified by the slave bit 1115 within the slave field 1127 of the frame 1110 the master has transmitted. The discrimination between the transmitter and the receiver is defined at the control field 1128 in the frame 1110. At the standing point of one station, in the transmission of the frame 1110, there is a possibility of providing four kinds of (a) master transmitter, (b) master receiver, (c) slave transmitter, and (d) slave receiver.

Section 2. Detailed Description of the Present Application

The remote control transmitter described in the present application will be described hereinafter.

(a) Construction of the embodiment

Figure 2:
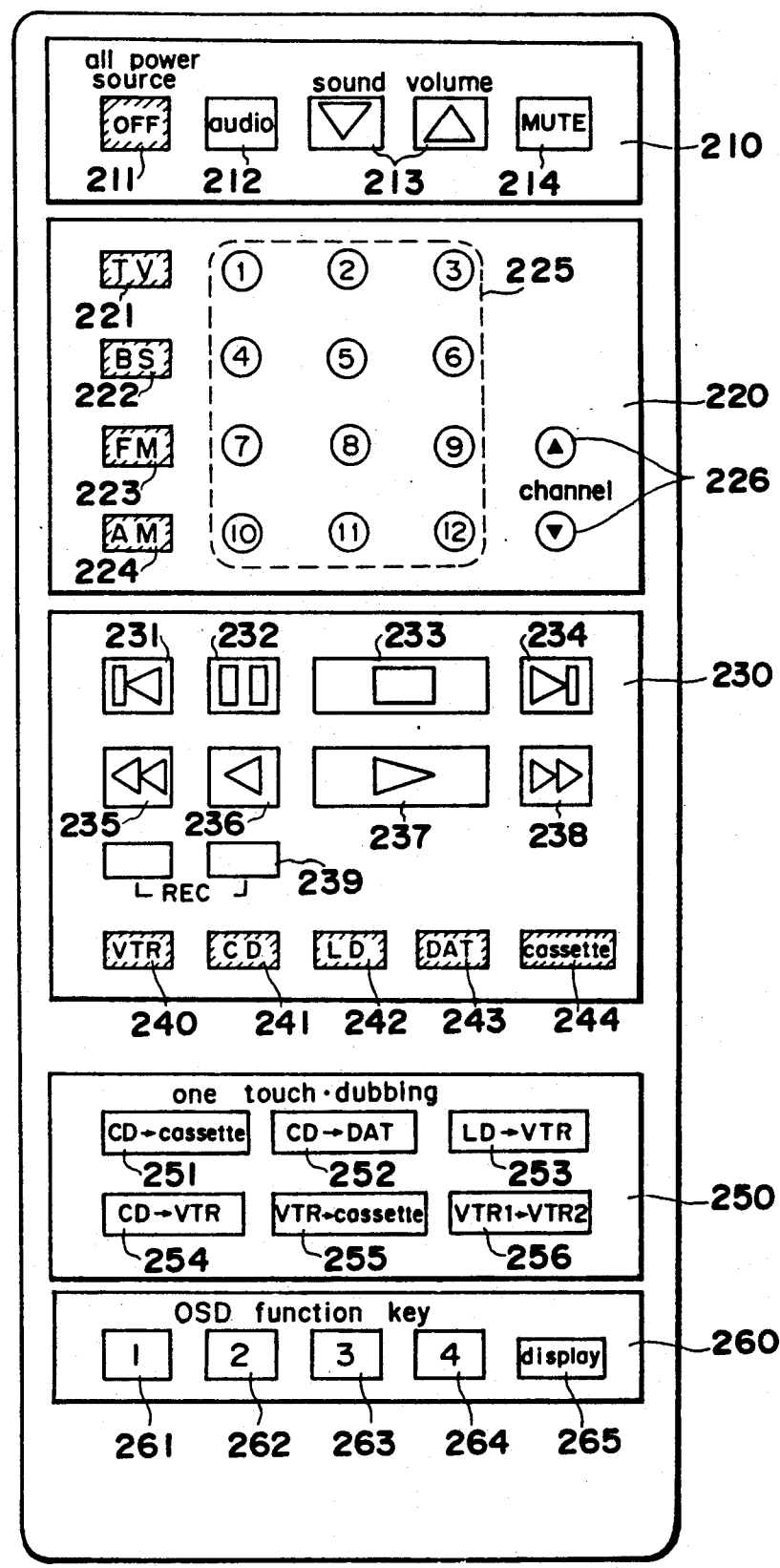
FIG. 2 is a plan view showing one example of a keyboard matrix of the remote control apparatus transmitting machine.

FIG. 1 shows a block diagram of the remote controlling transmitter to which the present invention is applied. Element 101 is a keyboard matrix by which the user may input the instructors. One example of the concrete contents of the keyboard matrix is shown in FIG. 2. Element 20 is a key for turning off the power supply of the whole system and a general key group for effecting the adjustment of the sound volume. Element 220 is a key group for broadcasting media use so as to select the broadcasting media or to select the channel. Elements 221 through 224 are device selection keys for broadcasting media use. Elements 225 and 226 are channel section keys. Element 230 is a key group for deck/-player use for selecting the deck/player or controlling the operation. Elements 231 through 239 are keys for the operation control use. Elements 240 through 244 are device selection keys for deck player use. In FIG. 1, element 103 is an input key discriminating means for judging which key of the keyboard matrix 101 has been depressed; element 104 is a code generating means which generates a data code string corresponding to the depressed key. Element 102 is a control means for controlling the logical processing of the remote control transmitter so as to take charge of the controlling operation of the keyboard matrix 101, the input key discriminating means 103, and the code generating means 104. Element 105 is a modulating means for modulating the data code string generated by the code generating means 104 into the signals suitable for transmission by the infrared rays; element 106 is an oscillating means for generating the carrier waves for effecting the modulation by the modulating means 105. Element 107 is a light emitting means for converting the data code string modulated by the modulating means 105 into the infrared rays so as to transmit it.

(b) Operation

The operation of the remote control transmitter of the present application will be described hereinafter.

Figure 3:
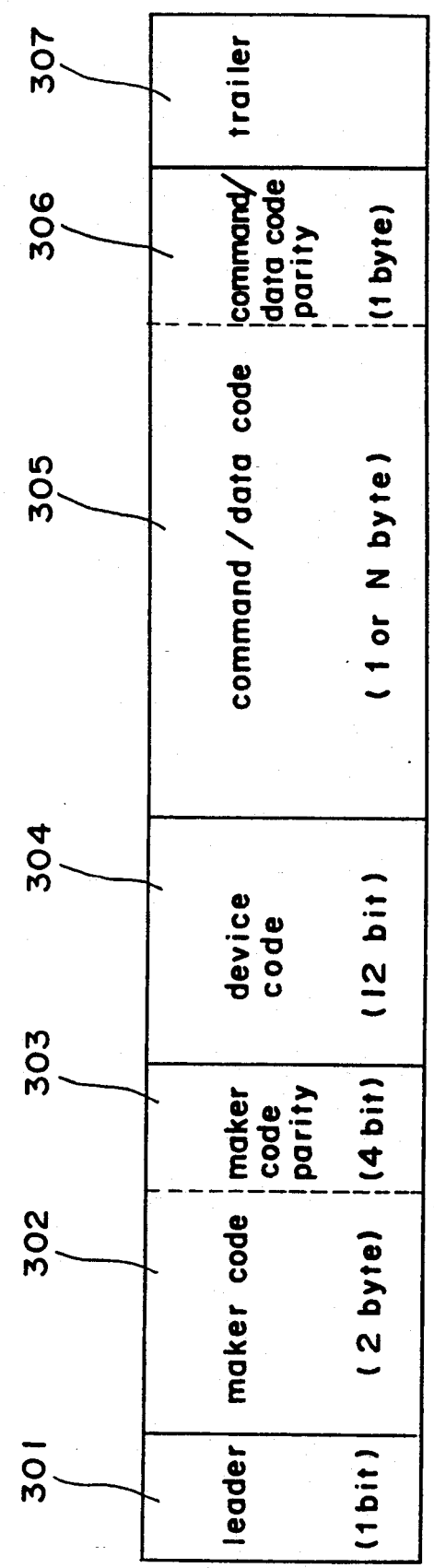
FIG. 3 is a model view showing a data format of a data code string sent from the remote control apparatus transmitter.

The control means 102 within the remote control transmitter normally scans the keyboard matrix 101 so as to transmit the information thereof into the input key discriminating means 103 when the user has depressed any key of the keyboard matrix. When the user depresses any of the keys, the information thereof is transmitted into the input key discriminating means 103. The input key discriminating means 103 judges from the transmitted signal which key has been depressed so as to transfer the results into the code generating means 104. In the code generating means 104, a data code string for transferring into the remote control reception part is generated in accordance with the signal transferred from the input key discriminating means 103. One example of the format of the data code string to be generated at this time is shown in FIG. 3. Element 301 is a leader showing the head of the data code string; element 302 is a maker code showing the discrimination of the maker; element 303 is a parity code for detecting the transfer error of the maker code; element 304 is a device code showing which device is to be controlled; element 305 is a command/data code showing how the device is controlled; element 306 is a parity code for detecting the transfer error of the command/data code; element 307 is a trailer showing the completion of the data code string. The format shown here is a recommendation format stipulated in the "error operation preventing measures for the infrared ray remote control household electric products" (issued in July, 1986) by the Foundation Household Electric Products Association. It is recommended to be used in a case where the transmitting of the remote control signal using infrared rays is effected. In the remote control transmitter of the present invention, two data code strings of the following (1), (2) are generated by the type of the depressed keys when the data code string of the format shown in FIG. 3 is caused by the code generating means 104.

(1) One of them is a case where the respective types of device selection keys 221 through 224 or 240 through 244 of the keyboard matrix 101 of the remote control transmitter have been depressed. At this time, a dummy code which does not have any meaning is accommodated in the region of the maker code 302 and the command/data code 305 in the transmission data format of FIG. 3. A code of the device corresponding to the depressed device selection key is accommodated in the region of the device code 304.

(2) The other of them is a case where keys except for the various types of device selection keys 221 through 224 and 240 through 244 of the keyboard matrix 101 of the remote control transmitter have been depressed. At this time, a dummy code which does not have any meaning is accommodated in the region of the maker code 302 and the device code 304 in the transmission data format of FIG. 3, and a data code which depends on only the key depressed by the user (for example, in the keys 231 through 239 for operation control use, the data code showing only the operation contents thereof, the data code which does not include the data as to which device is controlled by the keys 231 through 239 for the operation control use) is accommodated in the region of the command/data code.

In accordance with the above described procedure, the data code string generated by the cord generating means 104 by the above-described procedure is modulated into signals suitable for the transmission through the infrared rays by the modulation means 105 so as to be converted into the infrared ray signal by the light emitting means 107 for sending it.

Section 3. Detailed Description of the Present Application

The remote control reception part described in the present application will be described hereinafter.

(a) Construction of the embodiment

Figure 4:
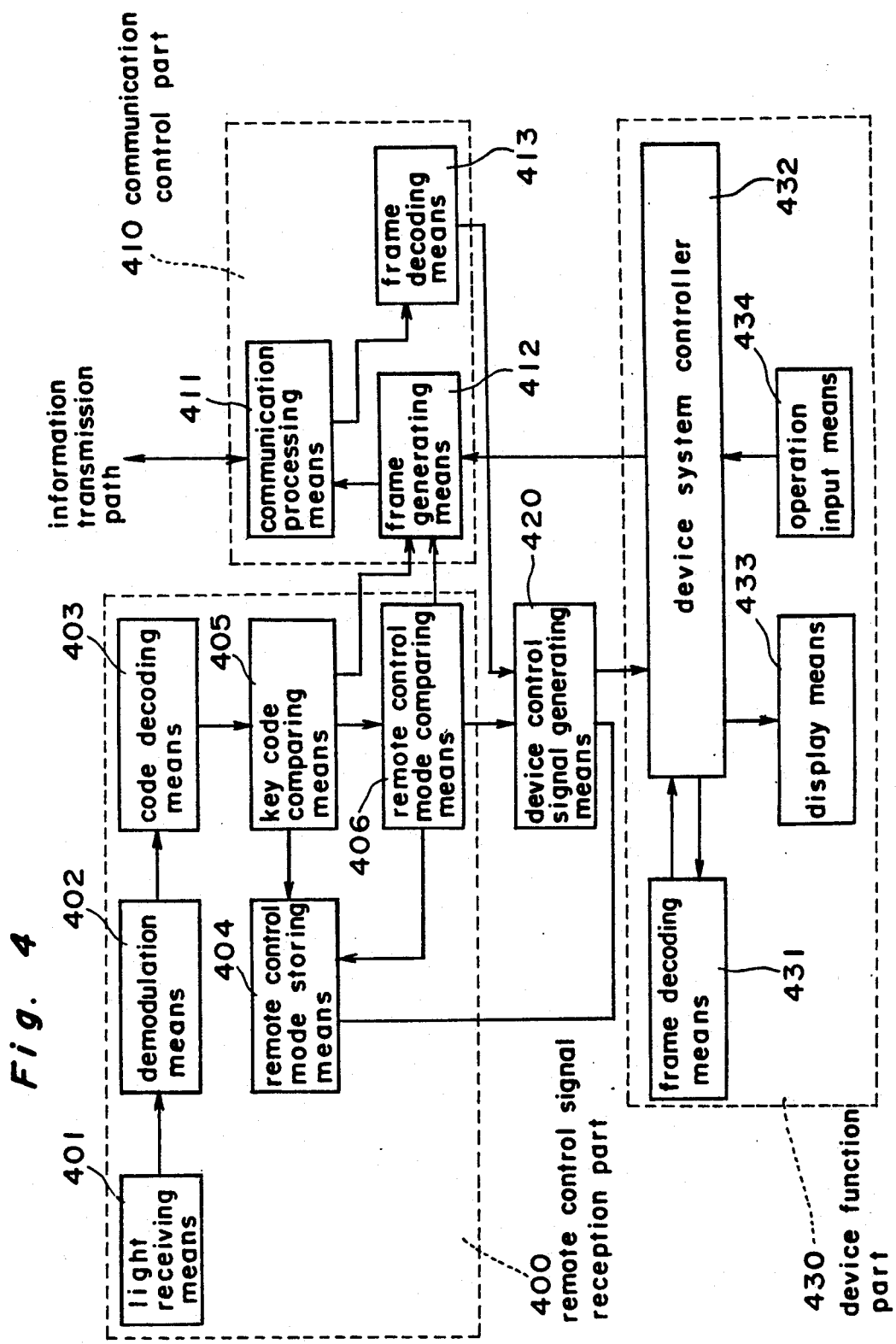
FIG. 4 is a block diagram of a device including the remote control apparatus reception part described in the present application.

FIG. 4 shows a block diagram of the device including the remote control reception part to which the present invention has been applied. Element 400 is a remote control signal reception part. Element 401 is a light receiving means for receiving the signal transmitted by the infrared rays so as to cover them into electrical signals; element 402 is a demodulation means for demodulating the signal converted into the electrical signal by the light receiving means 401 into a data code string; element 403 is a code decoding means for decoding the contents of the data code string; element 404 is a remote control mode storing means for storing the present remote control mode; element 405 is a key code comparing means for judging whether the contents of the data code string are the command of the device control or are the command for renewing the remote control mode; element 406 is a remote control mode comparing means for deciding which device is controlled by the contents of the remote control mode.

Element 410 is a communication control part for communicating with the other device through the information transmission path 1001. Element 411 is a communication processing means for effecting the processing operation for the communication described in the paragraphs of the frame construction and the basic communication procedure; element 412 is a frame generating means for transferring a frame into the information transmission path; element 413 is a frame decoding means for decoding the contents of the frame transferred from the information transmission path. Element 430 is a device function part which is the device main body for VTR, television and so on. Element 431 is a function part for realizing the function of the device main body; element 432 is a device system controller in charge of the control operation of the whole device; element 433 is a display means for displaying the various types of operations. Element 434 is an operation input means for the user to effect the various types of operations. Element 420 is a device control signal generating means for generating the control signal for controlling the device function part 430 from the command of the device control sent from the remote control and the information transmission path.

(b) Operation

The operation of the remote control reception part of the present application will be described hereinafter.

The remote control signal transmitted by the infrared rays from the remote control transmitter of the present application is received by the light receiving means 401, and is converted into an electrical signal and thereafter is transferred into the demodulating means 402. The signal is demodulated into the data code string generated by the code generating means 104 of the remote transmitter, and is transferred into the code decoding means 403.

Figure 5:
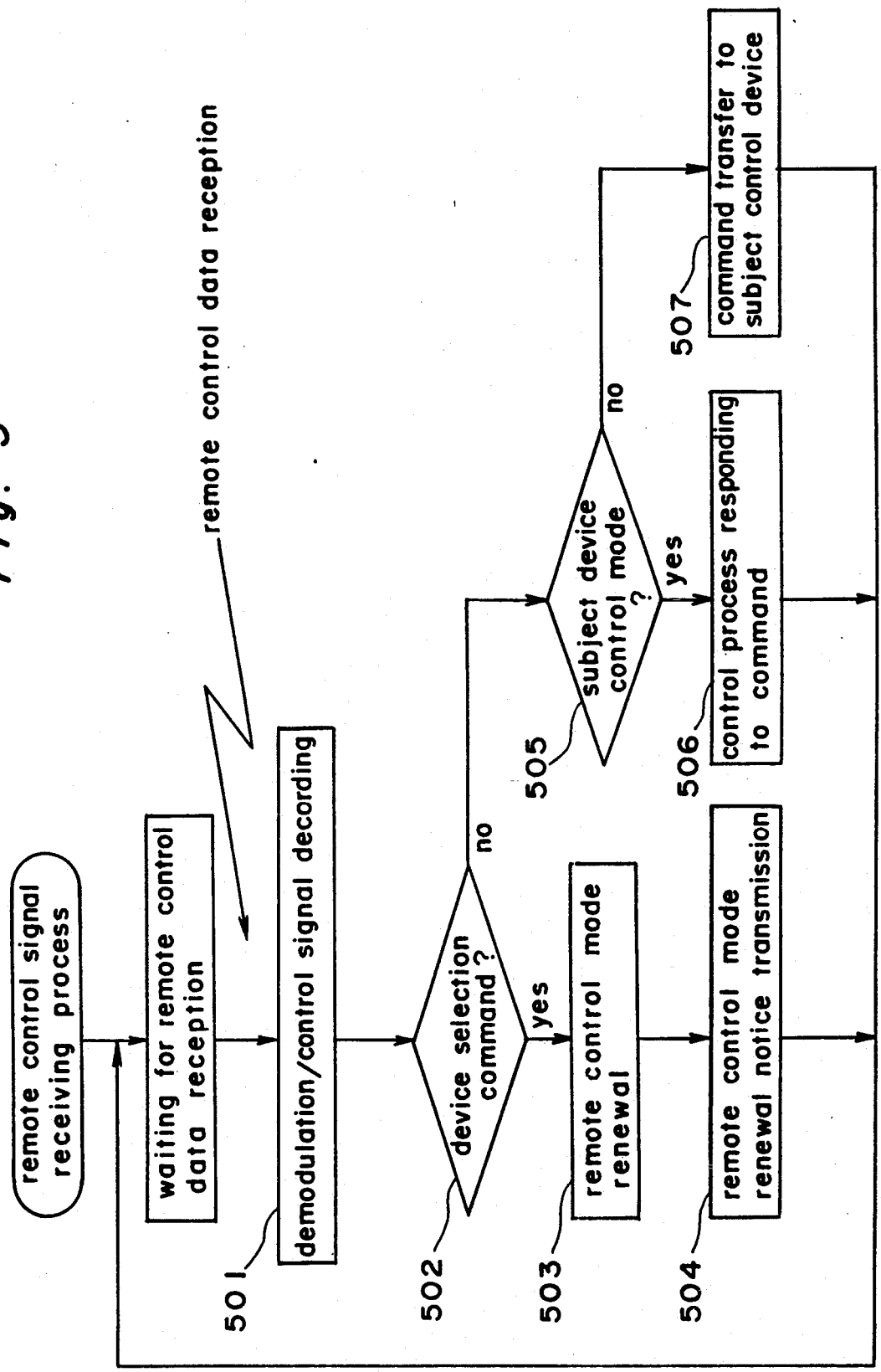
FIG. 5 is a flowchart of a remote control signal reception processing procedure.

The processing operation within the code decoding means 403 will be described in each processing step with reference to the flowchart shown in accordance with the remote control signal reception procession procedure of FIG. 5.

Step 501

In this step, the maker code parity 303 and the command data parity 306 of the data code string which has been transferred into the code decoding means 403 are checked. A determination is made that the transmission is free from the errors, and thereafter, the contents of the device code 304 and the command/data code 305 are decoded, the remote control key code corresponding to the data code string is reproduced so as to transfer it into the key code comparing means 405.

Step 502

If a determination is made that the key code showing which key of the remote control transmitter has been depressed only finds that it is a key code showing that each type of device selection keys 221 through 224 or 240 through 244 have been depressed, the information thereof is transferred into the remote control mode storing means 404 so as to advance to the step 503. Also, when the key code is one other than that of the respective types of device selection keys, the step goes to the step 505.

Step 503

In the step, the device code corresponding to the contents of the key code showing the depressed device selection key is stored in the remote control mode storing means 404 as the new remote control mode. Thereafter, a control order is transferred with respect to the device corresponding to the new remote control mode.

Step 504

In a case where a plurality of remote control reception parts exist in a system connected with the present reception part being connected with it, it is necessary to unify the remote control modes stored in all the remote control reception parts. In order to perform the remote control mode renewal procedure performed in the step 503 with respect to all the remote control reception parts in this step, the remote control mode renewal notice frame is generated by the frame generating means 412 so as to transmit it into all the remote control reception parts by way of the information transmission path 1001 through the processing of the communication processing means 411. Step 505

When the key code transferred from the remote control transmitter is a device control key other than that of the device selection key, a remote control mode comparing means 406 effects the comparison judgment as to whether the remote control mode stored in the remote control mode storing means 404 at present is a mode for controlling a device function part 430 to which the remote control receiver belongs or is a mode for controlling the other device. When the remote control mode stored in the remote control mode storing means 404 at present is a mode for controlling its own device, the contents of the key code are transferred into the device control signal generating means 420 so as to move to the step 506. When the remote control mode is a mode for controlling the other device, the contents of the key decoder is transferred into the frame generating means of the communication control part 410 so as to move to the step 507.

Step 506

In this step, a signal for controlling the device function part 430 is generated by the device control signal generating means 420 in accordance with the contents of the transferred key code so as to transfer it into the device system controller 432. The processing/operation in this step and its subsequent depend upon the function of the device system controller.

Step 507

In this step, the contents of the remote control mode stored in the remote control mode storing means 404 and the contents of the key code transferred from the remote control transmitter are transferred into the frame generating means 412; a frame for transferring the control order with respect to the device which has become the control object is generated so as to be transferred into the device by way of the information transmission path 1001 through the processing of the communication processing means 411.

The processing sequence of the data code string transferred from the remote control transmitter is effected as described hereinabove. Except for the processing, there are cases where the frame which is similar to the remote control mode renewal notice frame transferred with respect to the other remote control reception part in the step 504 may be transferred from the other remote control reception part. The processing procedure in this case will be described hereinafter.

The remote control mode renewal notice frame transferred from the other remote control reception part is transferred into the frame decoding means 413 through the communication processing means 411. When the frame is judged to be the remote control mode renewal notice frame by the frame decoding means 413, the contents thereof are transferred into the device control signal generating means 420 so as to renew the contents of the remote control mode storing means 404 into the value of the new remote control mode.

Section 4. Detailed Description of the Present Application

Finally the remote control method described in the present application will be described.

(a) Construction of the embodiment

Figure 6:
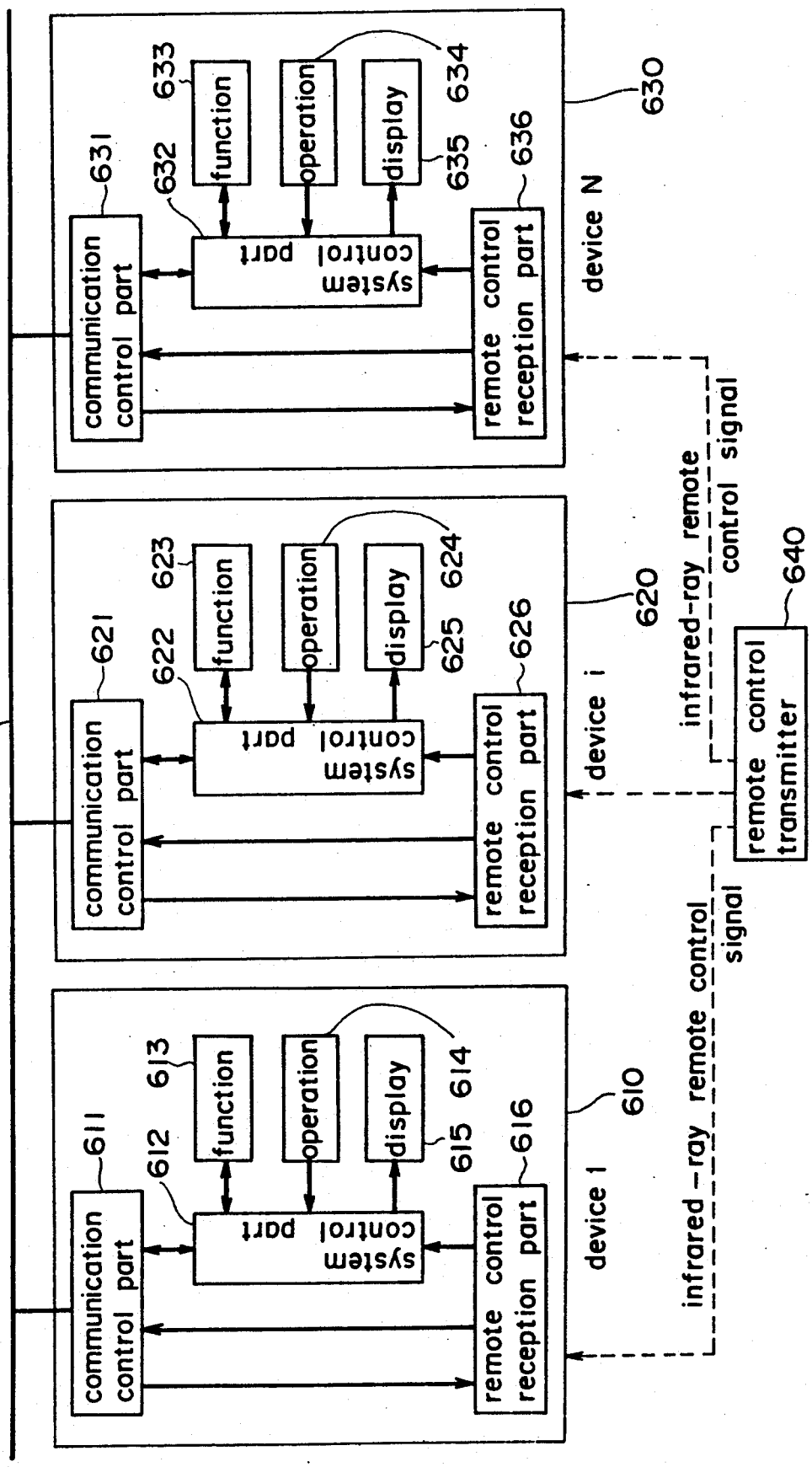
FIG. 6 block diagram in one embodiment of a system realizing a remote-control method described in the present application.

FIG. 6 shows a block diagram in one embodiment for realizing the remote control method of the present invention. Element 601 is an information transmission path for transmitting the frame with the respective devices being connected. Elements 610, 620, and 630 are devices for constituting this system. Elements 611, 621, and 631 are communication control parts for effecting the frame transfer using the information transmission path 601, and are equivalent to the communication control part 410 in FIG. 4. Elements 616, 626, and 636 are remote control reception parts described in the present application. Although all the devices 610, 620, 630 are shown to respectively have remote control reception parts 616, 626, 636 in the block diagram, it is possible to control all the devices constituting the system through the transferring operation of the data if at least one remote control reception part exists in one system. Element 640 is a remote control transmitter described in the present application, which is adapted to control all the devices connected with the system by the remote control transmitter 640. Thus, the remote control method to be described in the present application realizes the combination of the remote control transmitter described in the present application and the remote control reception parts described in the present application.

(b) Operation

The operation of the remote control method of the present invention will be described hereinafter. The remote control method is composed of the following three sequences.
(1) Device selection key processing sequence
(2) Device control key processing sequence
(3) Device panel operation processing sequence (1) Device selection key processing sequence The operation of the device selection key processing sequence will be described hereinafter with reference to FIG. 7(a). The operation in a case where the device i has been selected by the device selection key of the remote control transmitter 640 will become as follows.

Step 701

The data code string by the infrared rays emitted from the remote control transmitter 640 reaches to the remote control reception parts 616, 626, and 636. The operation step will be described with the remote control reception part 616 of the device 1 being provided as an example

Step 702

In accordance with the operation contents described in the present application in the remote control reception part 616, the remote control mode it has is renewed into the mode of the device i.

Step 710 through Step 712

The frame of the remote control mode renewal notice will be sequentially transferred with respect to the all the other remote control reception portions connected with the system. The reason why this step is carried out is that the remote control mode should be positively renewed even when the other remote control reception part could not receive the remote control signal of the step 701 because of some factors or other.

Step 706 through Step 708

The remote control reception part which has received the remote control mode renewal notice frame renews into the mode of the device which has been informed of the contents of the remote control mode storing means.

All the other remote control reception parts carry out the processing of the contents similar to those of the above described processing step. In the above described processing step, a case where the remote control mode renewal notice frame is transferred from the other remote control reception part to doubly renew the remote control mode is caused after the concepts of its own remote control mode storing means has been renewed by the data code string transferred from the remote control transmitter, but nothing interferes now that the contents to be renewed are the same to both.

The above described processing step is carried out so that the contents of the remote control mode storing means of all the remote control reception parts are renewed into the mode for controlling the device 620.

(2) Device control key processing sequence

The operation of the device control key processing sequence will be described hereinafter with reference to FIG. 7 (b). The operation in a case where the device control key has been operated by the remote control transmitter 640 when the remote control mode is the mode of the device 620 is as follows.

Step 720

The data code string reaches the remote control reception parts 616, 626, and 636 by the infrared rays emitted from the remote control transmitter 640.

Step 721, Step 730

Since the remote control mode at present is a mode of controlling the device 620, in the reception part 616 the controlling operation is not effected upon its own device so as to transfer into the device 620 a frame with a device control order corresponding to the key code demodulated from the received data code string being provided as the contents

Step 722

Since the present remote control mode is a mode for controlling its own device in the remote control reception part 626 of the device 620, the contents of the control order of the data code string received from the remote control transmitter 640 are decoded to generate the device control signal to transfer it into the device system controller 622 of its own device so as to effect the given control.

Step 723, Step 724

Any controlling operation is not effected upon the its own device as in the step 721 so as to transfer into the device 620 the frame with a device control order corresponding to the key code demodulated from the received data code string being provided as the contents.

When the above described processing step is all carried out, in the device 620, both the device control signal generated by way of the remote control reception part within the device 620 from the remote control transmitter 640, and the device control signal generated by the frame with the device control order transferred by way of the information transmission path from the other remote control reception part being provided as the contents are inputted into the device system controller 622. In this case, although the processing contents are different in the contents of the control signal, the proper processing corresponding to the control signal is effected within the device system controller.

(3) Device panel operation processing sequence

Finally the operation of the device panel operation processing sequence will be described with reference to FIG. 7 (c).

Step 740, Step 741

When the panel operation (for example, a disk is inserted into the device 630, and so on) of the device 630 has been effected, the device system control roller 632 detects the operation thereof to renew the remote control mode of the remote control reception part 636 within the its own device into a mode of controlling the device 630.

Step 750 through Step 752

The remote control mode renewal notice frame is transferred with respect to all the other remote control reception parts connected with the system to notify that the remote control mode has been renewed into the mode for the controlling the device 630.

Step 742 through Step 744

In the respective remote control reception parts, the step described in the present application is carried out to renew the remote control mode into a mode for controlling the device 630.

Section 5 Detailed Description

The receiver of the remote control apparatus described in the present invention will be described hereinafter.

(a) Construction of the embodiment

Figure 8:
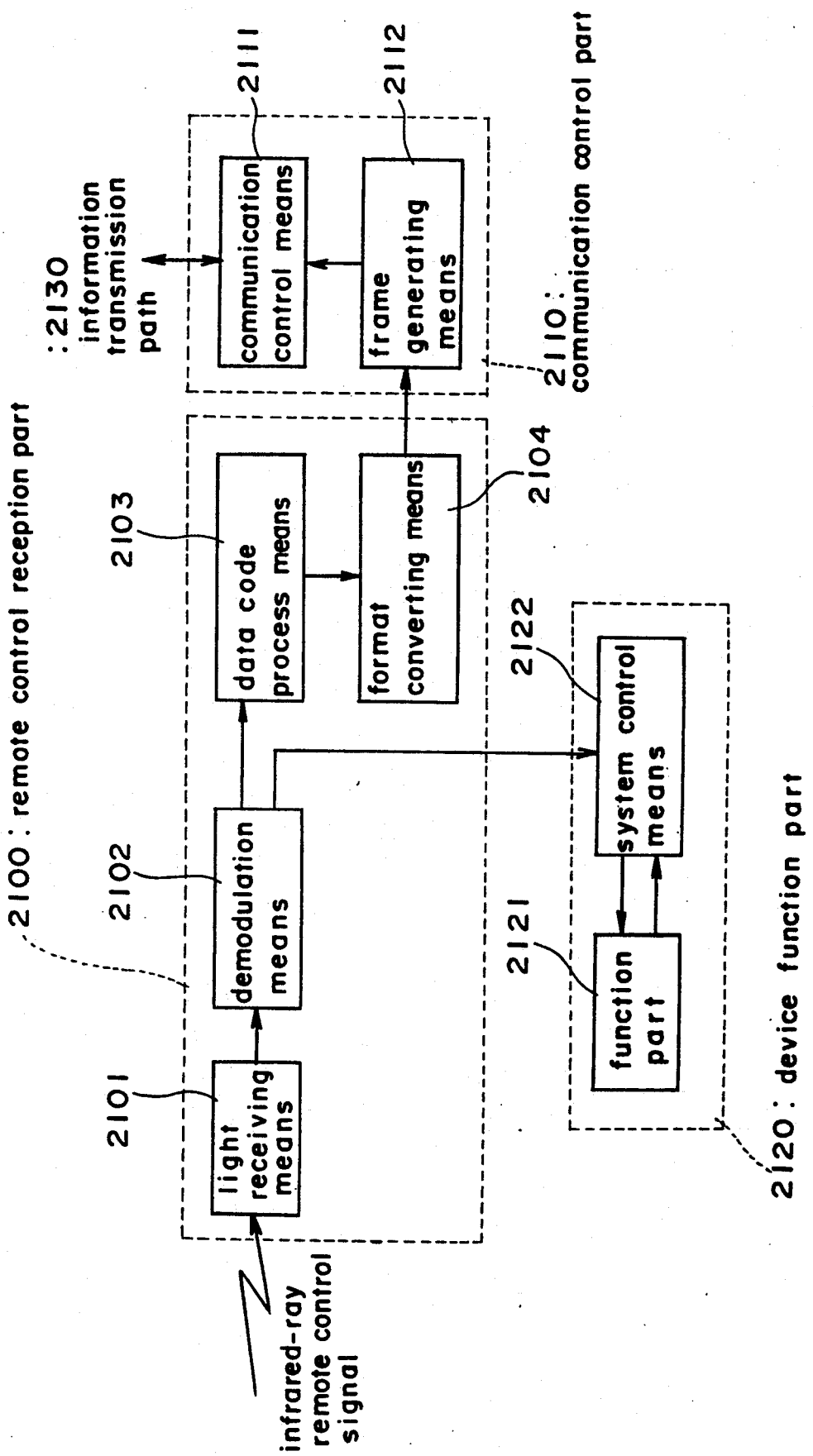
FIG. 8 is a block diagram for carrying a remote control method described in the present application and a remote control method described in the present application.

FIG. 8 shows a block diagram of the station to which the present invention is applied. Element 2130 is an information transmission route for effecting the transmission of the information with each station constructing the AV system being connected. Element 2100 is a remote control signal reception part which is a portion which is the same as the remote control reception parts 2100 m-1 through 2100 m-n in the whole construction view shown in FIG. 9. Element 2101 is a light receiving means for converting the received infrared signal into an electrical signal; element 2102 is a demodulation means for converting the electrical signal which has been converted by the light receiving means 2101 into the data code string in accordance with the specification defined in advance; element 2103 is a data code processing means which divides the data code string generated by the demodulation means 2102, and compares the contents with the previously defined data code table so as to determine whether or not the standard command corresponding to the reception data exists; element 2104 is a format converting means for effecting the format conversion necessary for the transfer onto the information transmission path 2130 of the reception command using the standard command when the standard command is judged to exist after the comparison thereof with the data code table.

Figure 9:
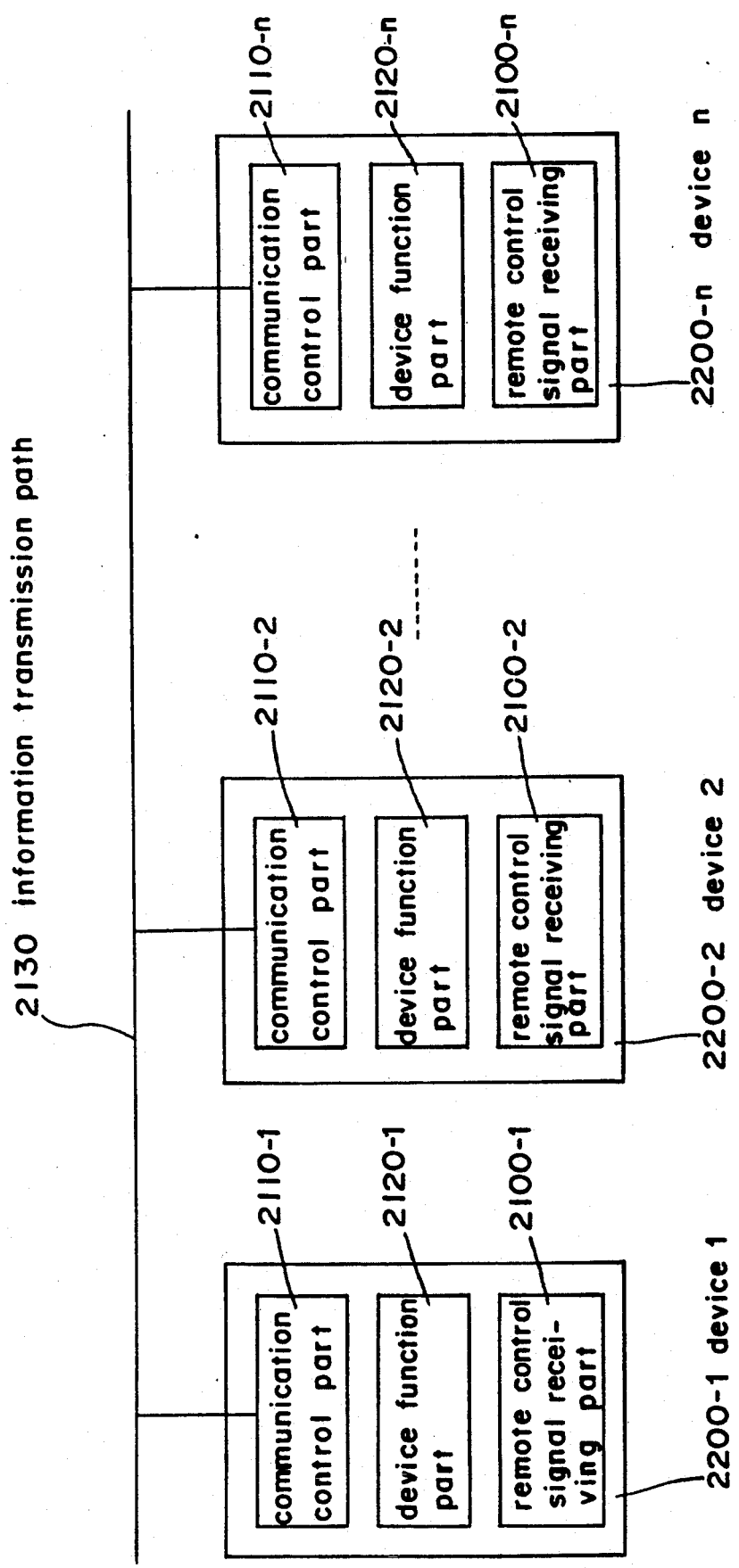
FIG. 9 is a block diagram of an information communication system described in the present application.

Element 2110 is a communication control part which is a portion which is the same as the communication control part portions 2110 m-1 through 2110 m-n in the entire block diagram shown in FIG. 9. Element 2111 is a communication control means for effecting electrical physical control so as to effect the data communication with the other station by way of the information transmission path 2130; element 2112 is a frame generating means for generating a frame of a type necessary for sending the data of the information transmission path 2130 by way of the communication control means 2111.

Element 2120 is a device function part, which is a portion corresponding to the device function parts 2120 m-1 through 2120 m-n in the entire block diagram shown in FIG. 9. Element 2121 is an original function part (for example, tuner, deck player part if it is a VTR) of the station; element 2122 is a system control means for controlling the functional operation of the station.

(b) Operation

The operation of the receiver of the remote control apparatus described in the present application will be described in detail with reference to the processing flowchart of FIG. 12. The processing contents to be described hereinafter are carried out by the light receiving means 2101, the demodulating means 2102, the data code processing means 2103 and the format converting means 2104 in the block diagram of FIG. 8.

Step 2501

Figure 12:
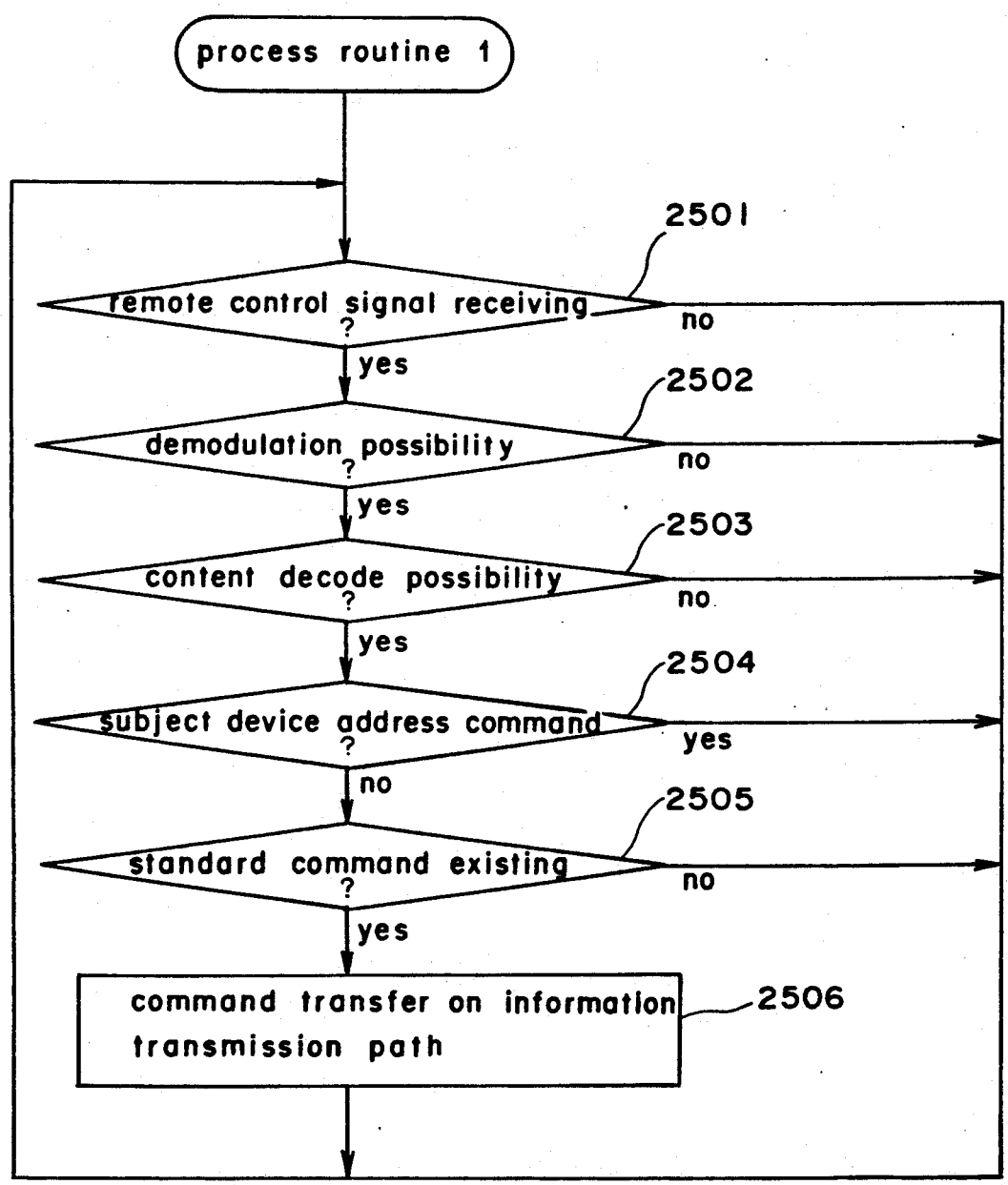
FIG. 12 is a processing flowchart for carrying out a remote control signal transfer method described in the present application.

The processing routine 1 shown in FIG. 12 is normally carried out. The step 2501 which is the initial step is processed by the light receiving means 2101 so as to check whether or not the remote signal has been received. In order to check it, a method of determining whether or not the remote control signal converted into the electrical signal from the infrared ray signal has been outputted into the output part of the light receiving means 2101 is general. When no signal has been outputted to the output of the light receiving means 2101, the processing operation of the processing routine 1 is finished on the assumption that no remote control signal has been received, and the operation returns to the start. When some signal has been outputted into the output part of the light receiving means 2101, it is judged that the signal of the infrared ray remote control has been received, and the step goes to the step 2502.

Step 2502

The step 2502 determines whether or not the received infrared ray remote control signal may be demodulated. Here "demodulation" means that the signal converted into the electrical signal by the light receiving means 2101 after the reception is inverted into the data code string of the "0" or "1" by the demodulation means 2102 in accordance with the previously determined rule.

The structure example of the infrared ray remote control signal is shown in FIGS. 11(a)–11(c) for reference so as to briefly explain the meaning of the demodulation. Generally the infrared ray remote control signal is composed of the combination of a high level signal (+5V by way of example of TTL level signal) to continue for the time of an integer multiple of a certain unit time "T" and a low level signal (0V by way of example of a TTL level signal). In the example of FIGS. 11(a)–11(c), when an electrical signal of retaining the high level continuously for the time period of "8T", and thereafter retaining the low level continuously for the time period of "8T" has been inputted, the demodulation is effected as the "header" meaning the head of the frame of the infrared ray remote control signal. Also, when an electrical signal which retains the high level continuously for the time period of "2T", and thereafter retains the low level continuously for the time period of the "2T" has been inputted, the demodulation is effected as the bit "0". Similarly, when an electrical signal which retains the high level continuously for the time period of the "2T", and thereafter retains the low level continuously for the time period of "6T" has been inputted, the modulating operation is effected as the bit "1". When the conversion may be effected into the data code string of the combination of the "0" and "1" from the received electrical signal by the combination of the unit time period "T" defined previously and the signal of some times as much as the unit time as in the example and the unit time, it is called modulatable. Also, the signal is judged to be impossible to be demodulated when the signal contrary to the contents previously defined has been received.

At the step 2502, when the impossible signal for the demodulation has been received, it becomes impossible to process the succeeding step, so that the processing is returned to the start of the processing routine 1 after the completion of the processing. When it has been judged that the demodulation may be effected, the demodulation processing operation is effected to advance into the following step.

Step 2503

At the step 2503, a determination is made as to whether or not the contents of the signal to be modulated by the demodulation means 2102 may be decoded. In the decode of the contents, the data code string demodulated by the demodulation means 2102 is divided into the bit unit defined previously. When the contents of the respective words (the bit string divided into the unit bit) agree with the contents of the previously defined data table, it is possible to decode the contents.

For reference, the remote control format example is shown in the data format examples of FIGS. 10(1) and 10(2). The remote control format example 1 of FIG. 10(1) is a signal format (hereinafter it is referred to as A company format) used in the infrared ray remote control corresponding station of a certain company at the comparatively early stage. Element 2301 is a header showing the head of the frame; element 2302 is a 5 bit device code for the discrimination of the station; element 2303 is a 6 bit data code showing the contents of the control command. Element 2304 is an inverted bit version of the 5 bit of device code, which is also 5 bits as in the device code; element 2305 is an inverted bit version of the data code, which is also 6 bits as in the data code; element 2306 is a 1 bit of check bit for detection of a data transmission error by the infrared ray.

The remote control format example 2 of FIG. (2) is a recommendation format (hereinafter referred to as Household Electric Product Association) stipulated in the "Error Preventing Measure For Infrared Ray Remote Control Household Electric Product" (issued in July, 1987) by the Foundation Household Electric Product Association. In order to prevent the signal of the infrared ray remote control transmitting device of a certain company from error-operating the station of the other company, the Household Electric Product Association Format is recommended to be used when the remote control signal using infrared rays is transmitted. Element 2311 is a header showing the head of the frame; element 2312 is a 16 bit maker code for discriminating the makers; element 2313 is a 4 bit parity code for preventing the reception error of the maker code; element 2314 is a 12 bit device code for discriminating the stations and so on. Element 2315 is a command/data code for transmitting the control command and the data, which is capable of a plurality of byte transfers with 8 bits as a unit. Element 2316 is a parity code for preventing reception errors of the device code and the command/data code.

In the step 2503, the data code string is divided into the bit unit previously defined as in the format example so as to check whether or not the contents corresponding to respective codes is defined in the table. It is judged that the contents may be decoded when the corresponding table exists, but the contents may not be decoded in cases except for it. In the receiver of the remote control apparatus of the present application, when the contents has been judged to be decoded at the step 2503, the step advances to the next step 2504. Since the successive processing operation cannot be carried out when the contents has been judged to be impossible to be decoded, the received data is scraped so that the processing routine returns to the start thereof.

Step 2504

At the step 2504, the contents of the reception signal which has been judged to be decoded at the step 2503 is checked so as to judge whether the received infrared ray remote control signal is a command addressed to one's station or a command addressed to another station. Through the consideration of the judgment in correspondence with the A company format and the Household Electric Product Association format of FIG. 3, the judgement is effected with reference to the device code 2302 in the case of the A company format, and the judgement is effected with reference to the maker code 2312 and the device code 2314 in the case of the Household Electric Product Association format.

When the judgement has been effected to be addressed to one's station at the step 2504, the data received without any processing is scraped at the data processing means 2103 so that the processing returns to the start thereof. The reason why no processing is effected is that the processing is carried out at the system control means 2122 when the signal is the command addressed to one's station, because the output of the demodulating means 2102 is transferred directly into the system control means 2122.

Step 2505

The contents of the portion equivalent to the station control command in the data code string of the infrared ray remote control signal which has been judged to be addressed to another station at the step 2504 is compared with the contents of the previously defined standard command table so as to advance to the next step 2506 when the corresponding standard command exists. Since the corresponding operation cannot be effected in the remote control method of the present invention when the standard command corresponding to the standard command table does not exist, the received data code string is scraped so that the processing returns to the head.

The portion equivalent to the station control command in the data code string is the data code 2303 or a command/data code 2315 provided in the remote control format example of FIGS. 10(1)-10(5).

The standard command means a command defined in the [84(Secretariat)86 I, II Draft—Domestic digital Bus].

Step 2506

At the step 2506, the conversion is effected into the standard command by the respective judgement processing up to the step 2505 so as to carry out the (1) command conversion, (2) format conversion and (3) transfer processing of the infrared ray remote control data which is transferable into the other station.

(1) Command conversion

The portion equivalent into the station in the data code string of the infrared remote control data, namely, the data code 3203 or the command/data code 2315 presented into the remote control format example of FIGS. 10(1)-10(5) processed to be replaced into the command defined by the [84(Secretariat)86 I, II Draft—Domestic digital Bus]. Generally, in the infrared ray remote control data, the station control command is defined by one word or one byte, with the above described standard command is composed of 1 byte of opcode and 1 byte of or a plurality of byte operands.

(2) Format conversion

The first section in the embodiment of the present invention: The contents of the message field 1129 in the frame described in the paragraph of the form and the basic communication procedure of the (c) frame in the summary description of the system are defined in further detail in the [84(Secretariat)86 I, II Draft—Domestic digital Bus]. One example thereof is presented in FIGS. 10(3) and 10(4). The message field in FIG. 22 is the same as the message field 1129 of FIG. 3 (c), with the contents thereof being defined as in FIG. 10 (4). The information to be transmitted at first is the routing information (information showing that the command is going to send to which subdevice of which station from which subdevice of which station) composed of a <BEGIN> code 2331, an operand 2332 of the <BEGIN>, a SSDA (SOURCE SUB-DEVICE ADDRESS) (DESTINATION SUB-DEVICE ADDRESS) 2334. Reference numeral SSDA 2333 is an address showing the start subdevice of the command, reference numeral DSDAS 2334 is an address showing the subdevice of the destination of the command. The actual command is transmitted next to the routing information. Here the standard command converted by the processing of the (1) command conversion is transferred in the form of the OPC (opecode) 2335+OPR (operand) 2336. Therefore, the command received as the infrared ray remote control data is command-converted, is accommodated in this portion in the form of the OPC+OPR and is transferred. The final <END> code 2337 is a code showing the completion or the like of the command frame. Also, on the slave address 1115 and the DSDA 2334 showing the station address of the destination of the command, the contents of the device code 2302 and the device code 2314 in the infrared ray remote control data are converted into the address defined in the [84(Secretariat)86 I, II Draft—Domestic digital Bus], and are accommodated. These format conversion processing is carried out by the format converting means 2104. The data code processing means 2103 and the format converting means 2104 described hereinabove are generally processed by the software by the use of the microprocessor.

(3) Transfer processing

The command conversion processing and the format conversion processing are carried out so as to effect the re-configuration. This is the processing of transferring the other station control frame into the given other station by way of the communication control part 2110. Since the other transfer party and the transfer contents are already specified with the above described format conversion processing, these frames are transferred into the frame generating means 2112 so as to set the other paragraphs (mode bit 1112, master address 1113, control code 1118 and so on). Thereafter, the frame is transferred into the station destination by the way of the information transmission route 2130 by the function of the communication control means 2111.

Since all the processings of the present application have been completed, the processing routine 1 is restored in the head thereof to prepare for the reception of the next infrared remote control data.

(c) Description of the concrete example in the embodiment

For the understanding of the present application described hereinabove, the illustration will be given with reference to the concrete example shown in FIGS. 13(1)-13(2). A case where the data of the A company format has been received will be described in an example in the following description.

As the example of the A company format, a case where the infrared ray remote control data shown in FIG. 13 (1) has been received will be taken into consideration. As the prerequisite of the following description, assume that: (1) the infrared ray remote control signal received may be demodulated; (2) the infrared ray remote control data received may be decoded in contents; (3) the infrared ray remote control data received is not a command addressed to one's station, and (4) the standard command corresponding to the infrared remote control signal received exists. Therefore, the step moves to the step 2506 by the carrying out of the processing routine 1 so as to effect the following processing. Also, the reception data is <device code 2302> =01011 (B), wherein the (B) means a binary representation. Hereinafter the binary and the hexadecimal are represented by (B) and (H) respectively. It is <Data code 2303> =100101 (B), wherein the device code and the data code are assumed to mean "VTR1" and "PLAY". When the reception data is converted into the format of FIG. 10 (3) and 10 (4) in accordance with the contents defined in the [84(Secretariat)86 I, II Draft—Domestic digital Bus], the respective data are determined as follows.

Although the mode bit 1112 depends on the function of the communication control means 2111, assume here that it is "mode 1". <Mode bit 1112, =01 (B) Assume that one's station is a "Television 1", and Master address 1113< =100 (H). Since the other party of the transfer is a "VTR1", <Slave address 1115> =120 (H). A method defined in the [84(Secretariat)86 I, II Draft—Domestic digital Bus]is used as the method of determining the address.

<Control code 1118> =1110 (B)

The BEGIN code 2331 through END code 2337 are accommodated in the message field 1129. Although the illustration is omitted from the BEGIN code 2331 among them, because the method of determining of DSDA 2334 is not necessary especially for the understanding of the present invention, the application of the definition of the [84(Secretariat)86 I, II Draft—Domestic digital Bus] becomes as follows.
<BEGIN2331> =BD (HD)
<OPR2332 of the BEGIN> =54 (H)
<SDDA2333> =C8 (H)
<DSDA2334> =20 (H)

The OPC2335 and OPR2336 corresponding to the data code of the A company format are determined as follows in accordance with the definition of the [84(Secretariat)86 I, II Draft—Domestic digital Bus].
<OPC2335> =C3 (H)
<OPR2336> =75 (H)

Finally, the END2337 meaning the completion of the frame is <END2337> =BE (H). When the contents determined by the above described method, the frame after the format conversion is provided as in FIG. 13 (2) and the frame is transmitted into the destination station by way of the information transmission path.

Section 6. Detailed Description of the Present Application

The remote control method described in the present application will be described hereinafter.

(a) Construction of the embodiment

As the construction of the station for embodying the receiver of the remote control apparatus described in the present application is the same as the construction of the station for embodying the remote control method described above, the description will be omitted.

(b) Operation

The operation of the receiver of the remote control apparatus of the present application will be described hereinafter with reference with the processing flowchart of FIG. 14. The processing contents to be described hereinabove is carried out by the light receiving light received means 2101, the demodulating means 2102, the data code processing means 2103 and the format converting means 2104 in the block diagram of FIG. 8.

Step 2601

Figure 14:
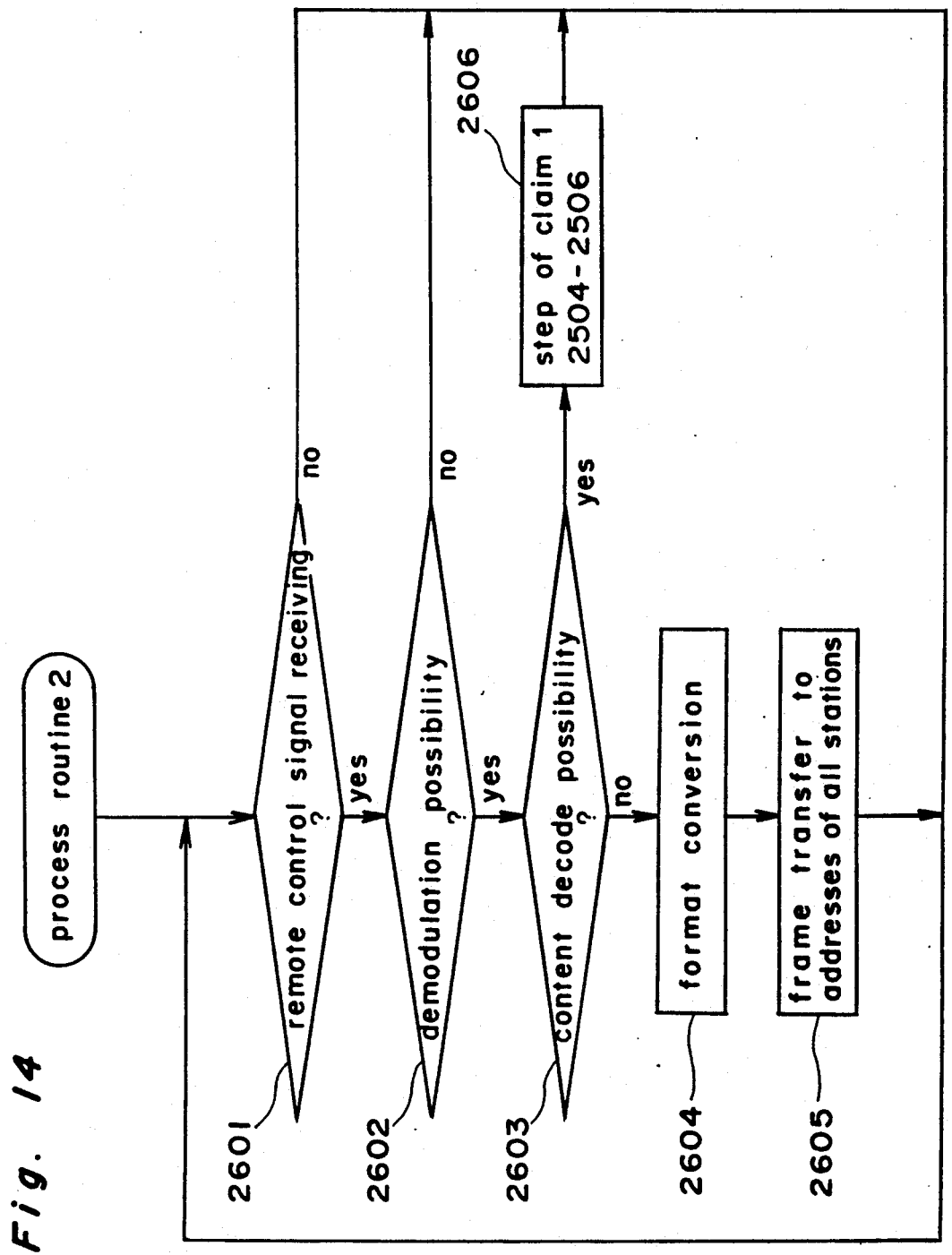
FIG. 14 is a processing flowchart for carrying out the remote control signal transfer method described in the present application.

Although the processing routine 2 shown in FIG. 14 is normally carried out, the step 2601 which is the initial step thereof is processed by the light receiving means 2101 so as to check whether or not the remote control signal has been received. Since the checking means and the processing method are completely the same as the step 2501 in the processing of the remote control method of the present application described above, the description of the processing method and so on are omitted.

When the remote control signal has not been received, the processing of the processing routine 2 is completed to return to the start. When the remote control signal has been received, the step advances into the step 2602.

Step 2602

At the step 2602, a determination is made as to whether or not the signal of the received infrared ray remote control may be demodulated. Since the meaning of the "demodulation" and "possible demodulation" and the judgement method are completely the same as the step 2502 in the processing of the remote control method of the present application described above, the description of the processing method and so on are omitted.

At the step 2602, when the signal possible to be demodulated has been received, it becomes impossible to effect the processing of the successive steps, the processing is completed here to return to the start of the processing routine 2. When the signal has been judged to be able to be demodulated, the demodulation processing operation is effected so as to advance to the next step.

Step 2603

At the step 2603, a determination is made as whether or not the contents of the signal demodulated by the demodulation means 2102 may be decoded. Since the meaning of the decoding of the contents and the contents decoding method are completely the same as the step 2503 in the processing of the remote control method described above, the description of the processing method and so on are omitted.

In this remote control method of the present application, when the content has been judged to be decoded at the step 2603, its subsequent processings become the same as the processing of the remote control method of the present application described above, so that the description thereof is omitted.

When the contents has been judged to be impossible to be decoded at the step 2603, the step advances to the next step 2604.

Step 2604

At the step 2604, the (1) format conversion and the (2) transfer processing are effected so as to transfer to another station, as the transparent (transmitting) data, the contents of the reception signal which has been judged to be impossible to be decoded in the contents at the step 2603.

(1) Format conversion

The processing of the format conversion within the format conversion means 2104. The procedure of the format conversion is classified into the following five processings.

Procedure 1: Extraction of the data to be transferred
Procedure 2: Division into the 8-bit unit
Procedure 3: Addition of the dummy bit
Procedure 4: Addition of the data classification, the format classification
Procedure 5: Construction of the frame Procedure 1: Extraction of the data to be transferred Only the data portion to be transmitted into the other station by way of the information transmission path is extracted from within the received infrared reception remote control data. Concretely, the header and the trailer are processed so as to be eliminated from the infrared remote control data received.

Procedure 2: Division into the 8-bit unit

A format which is not a system of 8-bit units like 5 bits in the device code and 6 bits in the data code as in FIG. 10 (1), a format which is a system of 8-bit units (or may be easily re-divided into 8-bit unit), and so on are mixed in the code system of the infrared ray remote control data. But in the frame on the information transmission path, the format has the data transmitted in the 8-bit unit, so that the unit is converted into the 8-bit unit in the case system which is not 8 bits in unit.

Procedure 3: Addition of the dummy bit

When the total number of the data of the received infrared ray remote control data is not an integral multiple of 8 bits, the unit is divided into 8-bit units by the procedure 2, thus generating insufficient bits on the last byte. The dummy bit is added to the insufficient number of the bits, so that such processing as may be converted correctly into 8-bit units may be effected.

Procedure 4: Addition of the data classification and the format classification

The generation of the part of the data to be transmitted into the transparent has been completed by the above described procedures. But the station which has received the data as they are by way of the information transmission path cannot judge what data it has received. Thus, the <data classification> identifier for identifying what data it is is added so as to display what the remote control data is.

Furthermore, a <format classification> identifier for identifying which format of remote control data it is is added so as to display the type of the format.

Procedure 5: Construction of the frame

The data field part generated by the processings of the procedure 1 through the procedure 4 are transferred into the frame generating means 2112 of the communication control part 2120 so as to compose the frame to be transmitted into the information transmission route 2130. The processing of the format conversion is completed by the above described processing.

(2) Transfer processing

The re-configuration is effected by the execution of the command conversion processing and the format conversion processing. The other station control frame is transferred into all the stations connected with the information transmission path by way of the communication control part 2110.

Since all the processings of the present application are completed, the processing routine 2 returns to the head thereof so as to prepare for the reception of the next infrared remote control data.

(c) Description of the concrete example in the embodiment

For further understanding of the present application described hereinabove, the concrete example will be described with reference to FIGS. 15(1)–15(5). In the following description, the reception of the data of the A company format will be described by way of example. A case where the infrared ray remote control data shown in FIG. 15(1) has been received is taken into consideration. As the prerequisite for the following description, it is assumed that: (1) the received infrared ray remote control signal may be demodulated, and (2) the received infrared ray remote control data cannot be decoded in the contents. Therefore, by execution of the procesessing routine 2, the step advances to the step 2604 so as to carry out the next process. Also, the reception data means <device code 2302> =01011 (B), wherein the (B) is a binary representation. Hereinafter the binary and the hexadecimal are represented by (B) and (H) respectively.

Assume that <data code 2303> =100101 (B). The concrete example of the step 604 will be shown hereinafter. The step 604 is processed by the following procedure as described in the paragraph of "(b) operation".

Procedure 1: Extraction of the data to be transferred
Procedure 2: Division into the 8-bit unit
Procedure 3: Addition of the dummy bit
Procedure 4: Addition of the data classification, the format classification
Procedure 5: Construction of the frame Procedure 1: Extraction of the data to be transferred The format of the infrared ray remote control data is composed as in the (1) and (2) of FIG. 10 as described in the description of the embodiment of the present application described above, with headers 2301, 2311 and trailers 2307, 2317 except for data necessary for the station control being attached. They are attached for recognition of the head and the end of the frame of the infrared ray remote control data, and are portions unnecessary in a case where the transferring operation is effected by the use of the frame of another format into another station. As the first procedure of the format conversion, these headers 2301 and 2311 and trailers 2307 and 2317 are eliminated, and the portions (device code 2302, data code 2303, device code inversion bit 2304, data code inversion bit 2305, check bit 2306) necessary for the transferring operation into the other station are extracted.

Procedure 2 and Procedure 3: Division into 8-bit units and addition of the dummy bit A format which is not a system of 8-bit units like 5 bits in the device code and 6 bits in the data code as in FIG. 10(1), a format which is a system of 8-bit units (or may be easily re-divided into 8-bit units), and so on are mixed in the code system of the infrared ray remote control data. But in the frame on the information transmission path, the format has the data transmitted in 8-bit units, so that the format be converted in 8-bit units in the case of the code system which is not 8 bits in length. A method of dividing the infrared ray remote control data of the above described A company format into 8-bit units is shown in the procedure of FIG. 15(2). Here a method of arranging the device code 2302, the data code 2303, the device code inversion bit 2304, the data code inversion bit 2305 and the check bit 2306 in one row so as to divide it from the head 8 bits by 8 bits. Generally there are many cases where the infrared ray remote control data totaled in all do not become the multiple of 8 bits. In this case, in order to cope with the cases, the dummy bits are accommodated by the number of the bits which is insufficient for the division into 8-bit units. The dummy bit may be either "0" or "1". When all the data of the device code 2302 through the check bit 2306 are totaled in this example, it becomes 23 bits, which are insufficient for the division into 8-bit units. Thus, the dummy bit 2350 is accommodated into the portion of the insufficient bit. In this example, the "0" is accommodated in the portion of the dummy bit 2350.

Procedure 4: Addition of the data classification, the format classification

The generation of the portion of the data to be transmitted to the transparent has been completed by the above described procedures. But the station which has received the data as they are by way of the information transmission path cannot judge what data it has received. Thus, the <data classification> identifier for identifying what data it is is added. Here assume that <data classification> =00 (H)→remote control data.

If the data is discriminated to be the remote control data by the <data classification>, there is not telling which format the remote control data comes from. Thus, the <format classification> identifier 2342 for recognizing which format the remote control data comes from is added. Here assume that <format classification> =00 (H)→A company format, 01 (H)→Household Electric Product Association format. Since the contents described so far are assumed to be the A company format, the <format classification> =00 (H).

The generation of the data field portion of the frame to be transmitted on the information transmission path has been completed by the above described procedure. To arrange it [00][00][5C][B4][6A] are provided (they are all hexadecimal) in the order of the <data 3> 2345 from the <data classification> 2341.

Procedure 5: Construction of the frame

The data field part generated by the processing of the procedure 1 through the procedure 4 is transferred into the frame generating means 2112 so as to effect the transfer processing.

These frames are transferred into the frame generating means 2112 and the other paragraphs (mode bit 1112, master address 1113, slave address 1115, control code 1118 and so on) are set. Thereafter, the frame is transferred into all the stations connected with the information transmission path by way of the information transmission path by the function of the communication control means 2111.

Section 7 Detailed description of the present invention

The receiver of the remote control apparatus of the present application will be described hereinafter.

(a) Construction of the embodiment

Figure 16:
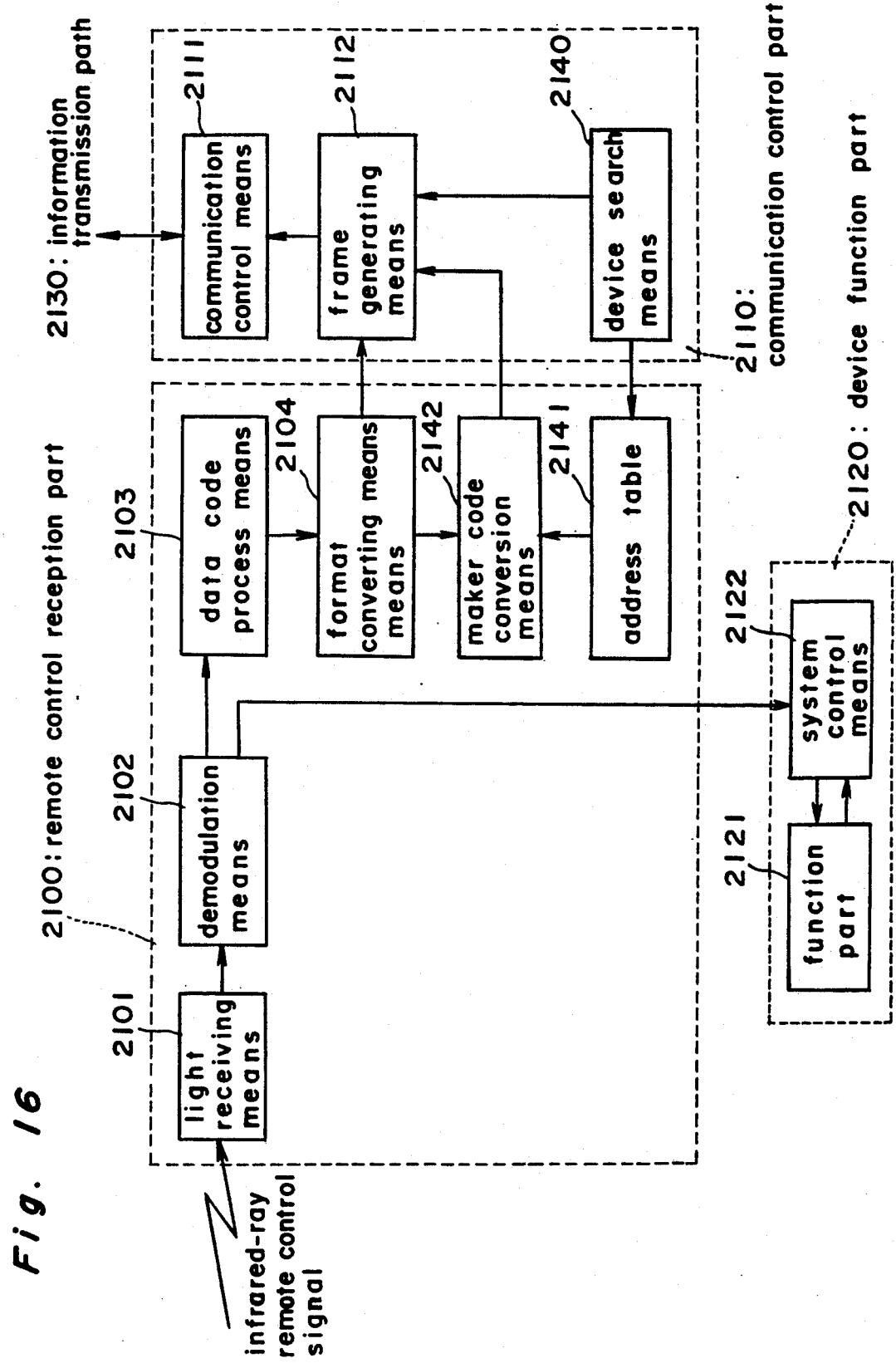
FIG. 16 is a block diagram for carrying out the remote control signal transfer method described in the present application.

FIG. 16 shows a block diagram of the station to which the receiver of the remote control apparatus of the present application is applied. Element 2130 is an information transmission path for the transmission of the information with the respective stations for constructing the AV system being connected.

Element 2100 is a remote control signal reception part, which is the same as the remote control reception parts 2100m-1 through 2100m-n in the whole block diagram shown in FIG. 9. Element 2101 is a light receiving means for converting the received infrared ray signal into electrical signals; element 2102 is a demodulating means for converting the electrical signals converted by the light receiving means 2101 into the data code string in accordance with the specification previously defined; element 2103 is a data code processing means for dividing into the significant data unit the data code string generated by the demodulating means 2102, comparing the contents with the data code table previously defined so as to check whether or not the standard command corresponding the reception data exists; element 2104 is a format converting means for effecting the format conversion necessary for the transferring operation of the reception command on the information transmission path 2130 by the use of the standard command when the standard command has been judged to exist through the comparison with the data code table.

Element 2140 is a device search means for searching the station address of the station to be connected with the information transmission path 2130 and the maker code so as to effect the registering process; element 2141 is an address table for registering the station address searched by the device search means 2140 and the maker code; element 2142 is a maker code comparing means for comparing the maker code contained in the received infrared ray remote control data with the maker code to be registered in the address table so as to pass into the frame generating means 2112 the consistent station address.

Element 2110 is a communication control part, which is the same portion as the communication control parts 2110m-1 through 2110m-n in the whole block diagram shown in FIG. 9. Element 2111 is a communication control means for effecting the electrical physical control for effecting the data communication with the other station by way of the information transmission path; element 2112 is a frame generating means for generating the frame of a form necessary to send the data into the information transmission path 2130 by way of the communication control means 2111.

Element 2120 is a device function part, which is a portion equivalent to the device function parts 2120m-1 through 2120m-n of the whole block diagram shown in FIG. 9. Element 2121 is an original function part (for example, a tuner or deck player part if it is a VTR) of the station; element 2122 is a system control means for controlling the functional operation of the station.

FIG. 17 is an address table for registering the station address of the station connected with the information transmission path 2139 and the maker code. Elements 2150, 2151, ... are station address accommodating regions for accommodating the station address values of the station connected with the information transmission path 2130; elements 2160, 2161, ... are maker code accommodating regions for accommodating the maker codes with the manufacturing maker of the station connected with the information transmitting path 2130 being coded. The maker codes 2160, 2161, ... correspond respectively to station addresses 2150, 2151, ....

(b) Operation

The receiver of the remote control apparatus of the present application will be described in detail with reference with FIG. 16, FIG. 17 and FIG. 18.

The receiver of the remote control apparatus of the present application is processed down to the step 2604. In the step 2605, a method of determining the opposite station of the frame for transferring onto the information transmission path 2130 is provided.

In order to carry out the method, each station connected previously with the information transmission path 2130 is required to search which maker it is so as to register on the address table 2141. The method thereof will be described at first.

All the station addresses of the stations connected with the information transmission pass 2130 are searched (this processing is called "device search"). A method of setting the data for making this search will be described with reference to the construction of the frame of FIG. 22. A most significant mode which one's station can support at present is set in the mode bit 1112 of the header field 1125. Then, the address of the one's station is accommodated in the master address bit 1113 of the master field 1126. Then, a least significant value which is approved as the address is set in the slave address bit 1115 of the slave field 1127. Then, a control code "0000 (B)" ... "lead slave status" for reading the condition of the other station is accommodated in the control bit 1118 of the control field 1128 (see Table 2). The frame is sent into the information transmission 2130 by the above described setting. The "lead slave status" is used for the control field 1118, because the influences inconvenient for the other station are avoided by the "device search".

The processing of the frame sending is effected by the frame generating means 2112 and the communication control means 2111. When the affirmative reply is returned as the ACK bit 1117 of the slave field 1127 with respect to the frames, it is judged the station of the address of the set contents in the slave address bit 1115 is connected to the information transmission path 2130, so that it is accommodated in the station address accommodation region 2150 (2151, ... ) of the address table 2143. Then, the value of the address which has been set in the slave address bit 1115 in the above description is increased by one so as to effect the similar processing. By the repetition of the above described processions, the addresses of all the stations connected onto the information transmission path 2130 may be accommodated into the station address accommodation regions 2150, ... of the address table 2143.

Then, the maker code is inquired with respect to the station registered in the station address accommodation area 2150 of the address table 2141, and the reply contents thereof are registered in the maker code accommodation region 2160.

The construction of the frame for the inquires about the maker codes is not defined here, because it is defined particularly. Although the contents of the maker code may be defined anyway, the use of the maker codes defined as one portion of the Household Electric Product Association remote control format simplifies the later processing.

The inquiry processing about the maker code is effected on all the stations accommodated in the station address accommodation region and is accommodated in the respective corresponding maker code accommodated regions.

The above description shows the completion of the investigation of the station address and the marker code of all the stations connected with the information transmission path 2130. The processing procedure by the remote control apparatus of the present application will be described hereinafter.

Figure 18:
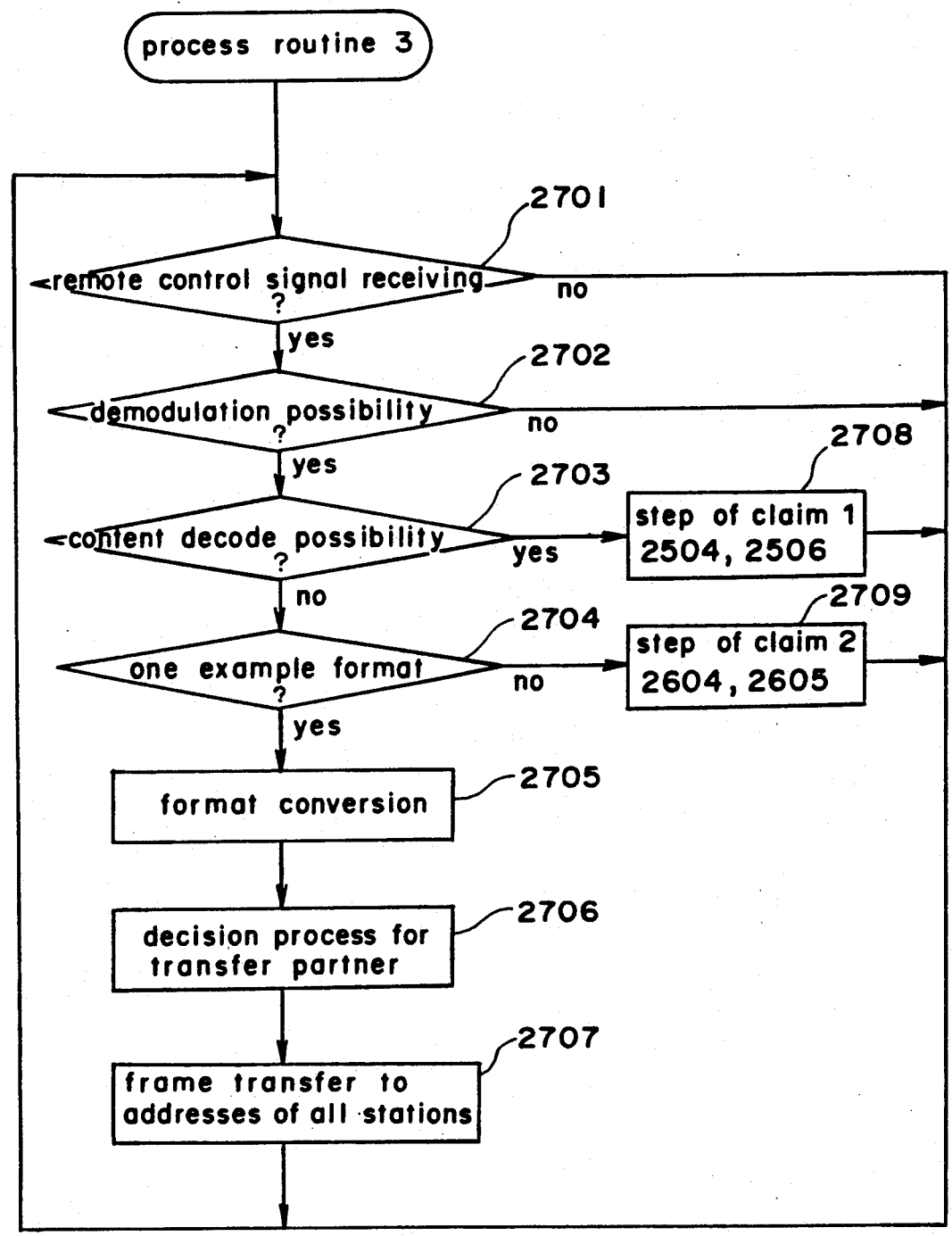
FIG. 18 is a processing flowchart for carrying out the remote control signal transfer method described in the present application.

Since the step 2704 from the step 2701 in the processing sequence chart of FIG. 18 is completely the same as the step 2604 from the step 2601 of the processing contents of the remote control method of the present application described above, the description thereof will be omitted.

Step 2705

At the step 2705, it is judged whether the received remote control data is a Household Electric Product Association remote control format or another format. When it is not the Household Electric Product Association remote control format, the processing of the present application is effected, because the following procedure cannot be applied. When it has been judged to be the Household Electric Product Association remote control, the step goes to the step 2706.

Step 2706

At the step 2706, the other transfer party of the frame is determined in accordance with the registration contents of the address table 2141.

In the case of the Household Electric Product Association remote control format, the maker code 2312 is defined in the contents of the frame. The contents of the maker code is standardized by the Household Electric Product Association. The maker code of the received infrared ray remote control data is compared with the maker code accommodated in the maker code accommodation regions 2160, ... of the address table 2143. When they are in conformity with each other, the station addresses accommodated in the station address accommodation regions 2150, ... corresponding to the maker code accommodation region 2160, ... are assumed to become a slave address bit 1115 so as to hand over it, together with the data field generated by the step 2704, to the frame generating means 2112. A frame to be sent to the information transmission path 2130 is generated by the frame generating means 2112 so as to send it into the information transmission 30 by way of the communication control means 2111. This processing is executed with respect to all the stations registered in the address table 2141 so as to send a frame which has the same data field with respect to all the station, whose maker codes being in conformity.

Section 8 Detailed description

The remote control method described in the present application will be described hereinafter.

(a) Construction of the embodiment

Figure 19:
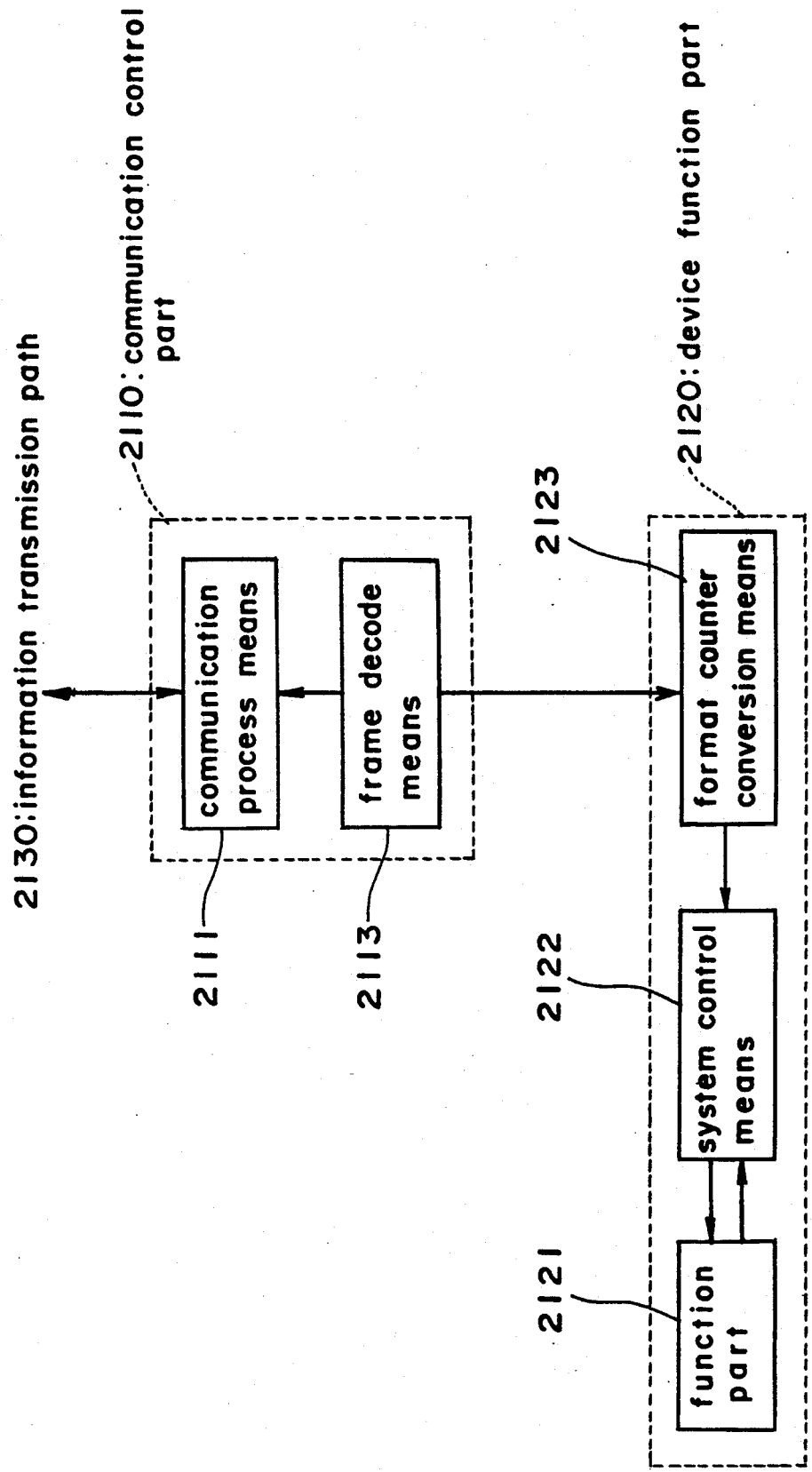
FIG. 19 is a block diagram for carrying the remote control method described in the present application.

FIG. 19 shows a block diagram of the station to which the remote control method described in the present application is applied. Element 2130 is an information transmission path for effecting the transmission of the information with each station constituting the AV system being connected.

Element 2110 is a communication control part, which has the same portions as the communication control part 2110m-1 through 2110m-n in the whole block diagram shown in FIG. 9. Element 2111 has a communication control means for effecting the electrical physical control in order to effect the data communication with the other station by way of the information transmitting path; element 2113 is a frame decoding means for analyzing the frame received by way of the communication controlling means 2111 from the information transmission path 2130 down to the usable form by the device function part 2120 to be described hereinafter.

Element 2120 is a device function part, which is portions corresponding to the device function parts 2120m-

1 through 2120m-1 of the whole block diagram shown in FIG. 9. Element 2121 is the original function part (for example, a tuner or a deck player part if it is a VTR) of the station. Element 2122 is a system control means for controlling the functional operation of the station; element 2123 is a format inverse conversion means for converting the frame from the frame decoding means 2113 into a signal for controlling the system controlling means 2122.

(b) Operation

The operation of the remote control method of the present application will be described in detail hereinafter with reference to the processing flow charts FIG. 19 and FIG. 20. The processing contents to be described hereinafter are carried out within the format inverse converting means 2123 in the block diagram of FIG. 19. The contents described in the present application is a procedure in which the station which has received the frame transferred onto the information transmission path 2130 by the use of the remote control method of the present application described above effects the inverse conversion (format inverse conversion) of the frame into the contents wherein the system controlling means 2122 may be operated.

Step 2801

Figure 20:
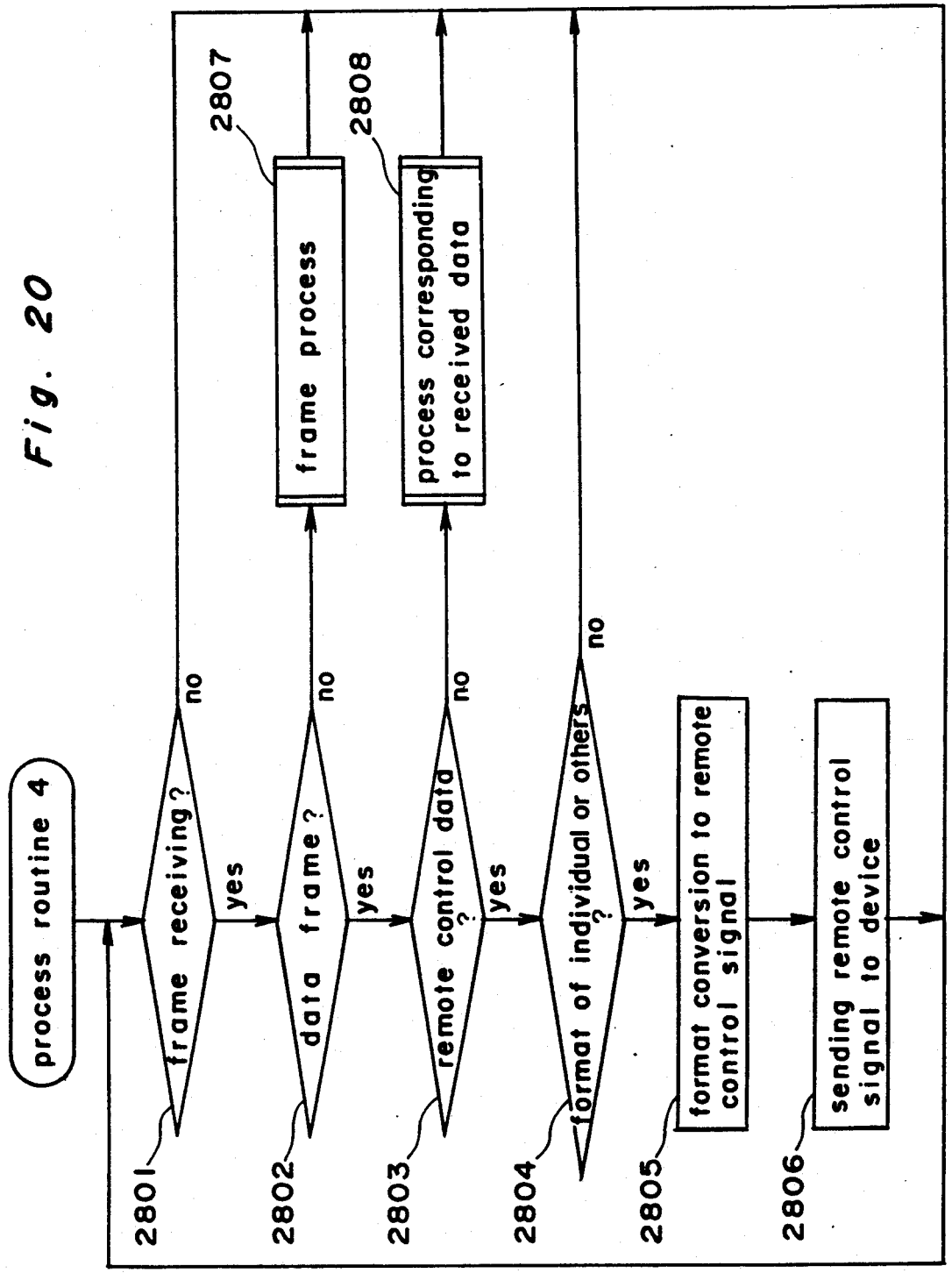
FIG. 20 is a processing flowchart for carrying out the remote control method described in the present application.

Although the processing routing 4 shown in FIG. 20 is ordinarily operated, the step 2801 which is the first step checks whether or not the frame has been received from the information path 2130. The check is carried out within the frame decoding means 2113. When the frame has not been received from the information transmission path 2130, the processing is completed without effecting the operation, and the processing routing 4 returns to the head thereof. When some frame has been received from the information transmission path 2130, the step advances to the step 2802.

Step 2802

Figure 15:
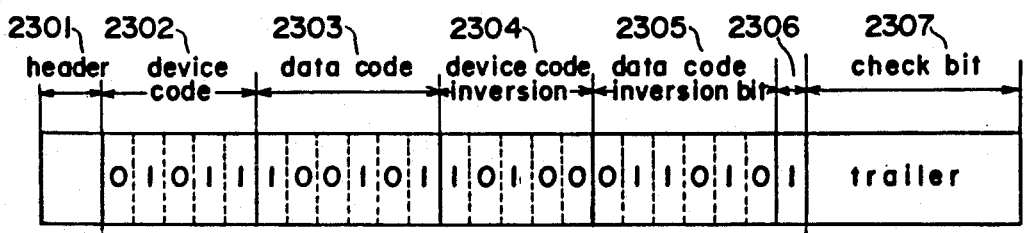
FIGS. 15(1)-15(5) are model charts showing the data conversion example in a case where the remote control signal transfer method described in the present application has been applied.
Figure 15:
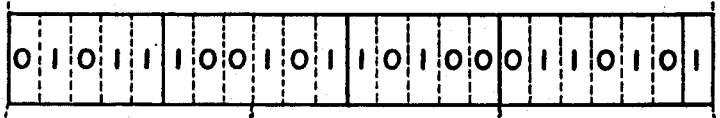
Figure 15:
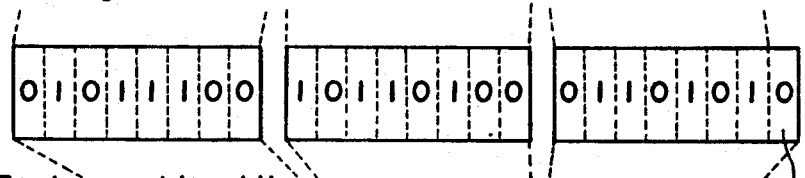
Figure 15:
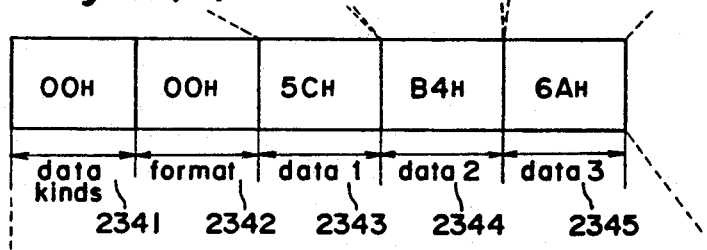
Figure 15:
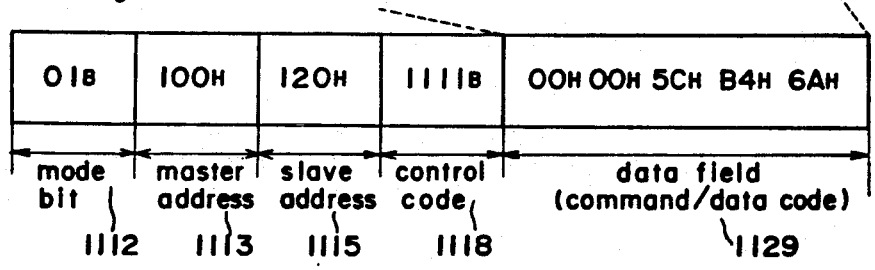

The construction of the frame the frame decoding means 2113 receives from the information transmission path 2130 is received in the shape of the format of FIG. 15(5). At this time point, at first the contents of the control code 2325 are checked to judge whether the received frame is a data frame or another frame. When the content is the frame except for the data frame, the step advances to the step 2807. Since the processing contents at the step 2807 are beyond the scope of the present invention, the description thereof is omitted.

Next, the frame decoding means 2113 extracts only the portion of the data field from the received data frame to transform it into a shape shown in the format of FIG. 15(4) and advances to the step 2803.

Step 2803

At the step, the contents of the <data classification> identifier 2341 of the frame shown in the format of FIG. 15(4) is checked to examine whether or not the received data frame is the remote control data. When the frame is not the remote control data after the checking operation, the step advances to the step 2808. Since the processing contents at the step 2808 are beyond the scope of the present invention, the description thereof will be described.

When the frame has been judged to be remote control data through the checking operation, the step advances to the step 2804.

Step 2804

At this step, the contents of the <format classification> identifier 2342 of the frame shown in the format of FIG. 15(4) to judge what data format the received remote control data frame is. In the case of the format, in which the system control means 2122 of the station which has received the frame can decode the contents like the remote control format of one's company or the standardized Household Electric Product Association format, the step advances to the step 2805. In the case of the format where the contents cannot be decoded except for it, the received frame is discarded to complete the processing and the processing returns to the head of the processing routine 4.

Step 2805

At this step, the received remote control data frame is set to the format designated by the format classification 2342 so as to re-configure the remote control data.

Step 2806

At this step, the remote control data re-configured at the step 2805 is transferred with respect to the system control means 2122. The reason why the signal to be sent to the system control means 2122 is put into the remote control data form is that means such as software and so on for decoding the remote control data and effecting the necessary control is already prepared within the system control means 2122. If the circumstances require, the contents of the remote control data are decoded and the function part 2121 may be directly controlled.

As all the processings are completed, the received frames are discarded, and the routine returns to the head of the processing routine 4.

(c) Description of the concrete example of the embodiment

In order to further understand the above description, a concrete example will be described hereinafter. The step 2805 and the step 2806 which were insufficient in the description in the paragraph "(b) operation" will be described here with emphasis.

Step 2805

At this step, the received remote control data frame is set to the format specified by the format classification 2342 so as to re-configure the remote control data.

Assume that the remote control data received at present is the A company format at the <format classification 2342> =0000 (H).

Also, assume that the actual contents of the received data 1, the data 2, the data 3 (2343 through 2345) are the contents shown in FIG. 15(3).

The first processing at the step is that the received data 1 through data 3 is bit-divided in accordance with the format specified by the <format classification> 2342. Since the A company format shown in the example is composed of a device code 5 bits 2302, a data code 6 bits 2303, a device code inversion bit 5 bits 2304, a data code inversion bit 6 bits 2305, a check bit 1 bit 2306, the received data are divided into 5 bits, 6 bits, 5 bits, 6 bits, 1 bit from the head. When the above described re-division has been effected, the bit left over last is judged to be the dummy bit 2350 and is deleted. In this example, one bit is deleted as the dummy bit (see FIG. 15(2)).

Then, a head 2301 is added before the device code 2302, the trailer 2307 is added after the check bit 2302 so as to complete the remote control data frame of the A company format.

The processing at this step is different in the method or the like of re-dividing of the bit row by the contents specified by the <format classification> 2342.

Step 2806

Since the step is effected as in the paragraph of the "(b) operation", the description will be omitted.

Although the receiver of the remote control apparatus has been built in each device in all the embodiments, it may be constructed as a separate member in the system in addition to the above description.

What is claimed is:

1. A remote control system for controlling at least two electronic devices each having an identifying address and at least more than two individual predetermined operating modes, connected to the other devices through information transmission paths and positioned to be controlled by a remote control signal transmitted from a transmitter which is adapted to transmit the signal consisting of either an operation signal for controlling the operation of each of the devices or a designation signal for designating one of the identified devices to be controlled by the operation signal, each of the devices comprising:

a receiver for receiving the remote control signal,
   a control means for controlling the operation of the device in connection with the predetermined mode upon receiving the signal from the receiver, and
   a communication means for transmitting the signal from the receiver to the other devices through the paths,
   said receiver including:
   a storing means for storing the designation signal having been transmitted from the transmitter so as to be able to control by an operation signal from the transmitter for controlling the control means in the predetermined modes;
   a first comparing means for judging whether the signal presently received from the transmitter is an operation signal or a designation signal, and, in the case of the presently received signal being a designating signal, comparing the presently received designating signal with the designation signal having been stored in the storing means to maintain the designation signal in the storing means in the case of coincidence between them, while, in the case of disagreement between them, the designation signal in the storing means is replaced by the presently received designating signal from the transmitter which is also transmitted to all receivers of the other devices through the communication means; and
   a second comparing means for comparing, upon receiving the just received signal being an operation signal from the first comparing means, the identifying address of the device designated by the designation signal having been stored in the storing means with the identifying address of the device receiving the remote control signal, and, if the two identifying addresses are the same, sending the operation signal to the control means, while, if the two identifying addresses are different, the operation signal is sent to the device designated by the designation signal having been stored in the storing means.

2. A remote control system for controlling at least two electronic devices each connected with the other devices through information transmission paths and having an identifying address, at least more than two individual predetermined operating modes, and at least more than one operational actuator which is operable by an operator to transmit a remote control signal consisting of either an operational signal for controlling the operation of each of the devices or a designation signal for designating one of the identified devices to be controlled by the operational signal, each of the devices comprising:

a receiver for receiving the remote control signal;
   a control means for controlling the operation of the device in connection with the predetermined mode upon receiving the signal from the receiver; and
   a communication means for transmitting the signal from the receiver to the other devices through the paths,
   said receiver including:
   a storing means for storing the designation signal having been transmitted from the actuator so as to be able to control by an operational signal from the actuator for controlling the control means in the predetermined modes;
   a first comparing means for judging whether the signal presently received from the actuator is an operational signal or a designation signal, and, in the case of the presently received signal being a designating signal, comparing the presently received designating signal with the designation signal having been stored in the storing means to maintain the designation signal in the storing means in the case of coincidence between them, while, in the case of disagreement between them, the designation signal in the storing means is replaced by the presently received designating signal from the actuator which is also transmitted to all receivers of the other devices through the communication means, and
   a second comparing means for comparing, upon receiving the just received signal being an operation signal from the first comparing means, the identifying address of the device designated by the designation signal having been stored in the storing means with the identifying address of the device receiving the remote control signal from the actuator, and, if the two identifying addresses are the same, sending the operation signal to the control means, while, if the two identifying addresses are different, the operational signal is sent to the device designated by the designation signal having been stored in the storing means.

3. A remote control system for controlling at least two electronic devices each connected with the other devices through information transmission paths and having an identifying address, at least more than two individual predetermined operating modes, and at least more than one operational actuator which is operable by an operator to transmit a remote control signal consisting of either an operational signal for controlling the operation of each of the devices or a designation signal for designating one of the identified devices to be controlled by the operational signal, each of the devices comprising:

a receiver for receiving the remote control signal;

a control means for controlling the operation of the device in connection with the predetermined mode upon receiving the signal from the receiver; and a communication means for transmitting the signal from the receiver to the other devices through the paths, said receiver including:

a first demodulation means having a specific signal arrangement stored therein, said specific signal arrangement being compared with the signal arrangement of the signal unit received by the receiver so as to output a signal indicating the agreement or disagreement therebetween;

a second demodulation means for judging, upon receiving the agreement signal from the first demodulation means, whether or not the device select signal of the signal unit is directed to the device having the receiver so as to output a signal indicating the identity or non-identity thereof;

a data code process means for judging, upon receiving the disagreement signal from the first demodulation means, whether or not the control command of the device control signal of the signal unit is a kind of command common to the other devices to output a signal indicating whether the command is common or special;

a first format converting means for converting, upon receiving the disagreement signal from the first demodulation means or the special signal from the data code process means, the signal unit of the transmitter to an equivalent transfer signal for transferring through the information transmitting paths;

a second format converting means for converting, upon receiving the command signal from the data code process means, the signal unit of the transmitter to a control command for operating the designated device;

a frame generating means for forming the equivalent transfer signal into a first transfer signal for transferring toward all of the other devices through the information transmitting paths, and for forming the control command into a second transfer signal for transferring toward the designated device through the information transmitting paths; and a system control means for controlling, upon receiving the identity signal from the second demodulation means, the operation of the device on the basis of the device control signal of the signal unit; and the other devices each comprising:

a frame decode means for judging whether or not the transfer signal from the frame generating means of the device is a common command to output a signal indicating whether the command is common or special;

a first format counter conversion means for converting the transfer signal to the original signal unit in a counter, upon receiving the special signal from the frame decode means;

a second format counter conversion means for judging whether or not the signal unit from the first format counter conversion means has a specific signal arrangement relating to each of the other devices to output a signal indicating the agreement or disagreement therebetween;

a format counter conversion means for neglecting, upon receiving the disagreement signal from the second format counter conversion means, the signal unit, and for judging, upon receiving the agreement signal from the second format counter conversion means, whether or not the signal unit is directed to each of the other devices to output a signal indicating the identity or non-identity thereof; and a system control means for neglecting, upon receiving the non-identity signal from the format counter conversion means, the signal unit, and for controlling, upon receiving one of the identity signal from the format counter conversion signal and the common signal from the frame decode means, the operation of the designated device on the basis of the device control signal of the signal unit.

4. A remote control system for controlling at least two electronic devices each connected with the other devices through information transmission paths and having an identifying address, at least more than two individual predetermined operating modes, and at least more than one operational actuator which is operable by an operator to transmit a remote control signal consisting of either an operational signal for controlling the operation of each of the devices or a designation signal for designating one of the identified devices to be controlled by the operational signal, each of the devices comprising:

a receiver for receiving the remote control signal;

a control means for controlling the operation of the device in connection with the predetermined mode upon receiving the signal from the receiver; and a communication means for transmitting the signal from the receiver to the other devices through the paths, said receiver including:

a first demodulation means having a specific signal arrangement stored therein, said specific signal arrangement being compared with the signal arrangement of the signal unit received by the receiver so as output a signal indicating the agreement or disagreement therebetween, and for neglecting the signal unit in the case of outputting the disagreement signal;

a second demodulation means for judging, upon receiving the agreement signal from the first demodulation means, whether or not the device select signal of the signal unit is directed to the device having the receiver so as to output a signal indicating the identity or non-identity thereof;

a data code process means for judging, upon receiving the disagreement signal from the first demodulation means, whether or not the control command of the device control signal of the signal unit is a kind of command common to the other devices to output a signal indicating whether the command is special;

a first format converting means for converting, upon receiving the special signal from the data code process means, the signal unit of the transmitter to an equivalent transfer signal for transferring through the information transmitting paths;

a second format converting means for converting, upon receiving the common signal from the data code process means, the signal unit of the transmitter to a control command for operating the designated device;

a frame generating means for forming the equivalent transfer signal into a first transfer signal for transferring toward all of the other devices through the information transmitting paths, and for forming the control command into a second transfer signal for transferring toward the designated device through the information transmitting paths; and a system control means for controlling, upon receiving the identity signal from the second demodulation means, the operation of the device on the basis of the device control signal of the signal unit; and the other devices each comprising;

a frame decode means for judging whether or not the transfer signal from the frame generating means of the device is a common command to output a signal indicating whether the command is common or special;

a first format counter conversion means for converting the transfer signal to the original signal unit in a counter, upon receiving the special signal from the frame decode means;

a second format counter conversion means for judging whether or not the signal unit from the first format counter conversion means has a specific signal arrangement relating to each of the other devices to output a signal indicating the agreement or disagreement therebetween;

a format counter conversion means for neglecting, upon receiving the disagreement signal from the second format counter conversion means, the signal unit, and for judging, upon receiving the agreement signal from the second format counter conversion means, whether or not the signal unit is directed to each of the other devices to output a signal indicating the identity or non-identity thereof; and a system control means for neglecting, upon receiving the non-identity signal from the format counter conversion means, the signal unit, and for controlling, upon receiving one of the identity signal from the format counter conversion signal and the common signal from the frame decode means, the operation of the designated device on the basis of the device control signal of the signal unit.

5. A remote control system for controlling at least two electronic devices each connected with the other devices through information transmission paths and having an identifying address, at least more than two individual predetermined operating modes, and at least more than one operational actuator which is operable by an operator to transmit a remote control signal consisting of either an operational signal for controlling the operation of each of the devices or a designation signal for designating one of the identified devices to be controlled by the operational signal, each of the devices comprising:

a receiver for receiving the remote control signal;

a control means for controlling the operation of the device in connection with the predetermined mode upon receiving the signal from the receiver; and a communication means for transmitting the signal from the receiver to the other devices through the paths, said receiver including:

a first demodulation means having a specific signal arrangement stored therein, said specific signal arrangement being compared with the signal arrangement of the signal unit received by the receiver to output a signal indicating the agreement or disagreement therebetween;

a second demodulation means for judging, upon receiving the agreement signal from the first demodulation means, whether or not the device select signal of the signal unit is directed to one device having the receiver so as to output a signal indicating the identify or non-identity thereof;

a data code process means for judging, upon receiving the disagreement signal from the first demodulation means, whether or not the control command of the device control signal of the signal unit is a kind of command common to the other devices to output a signal indicating whether the command is common or special, and for neglecting the signal unit in the case of outputting the special signal;

a first format converting means for converting, upon receiving the disagreement signal from the first demodulation means, the signal unit of the transmitter to an equivalent transfer signal for transferring through the information transmitting paths;

a second format converting means for converting, upon receiving the common signal from the data code process means, the signal unit of the transmitter to a control command for operating the designated device;

a frame generating means for forming the equivalent transfer signal into a first transfer signal for transferring toward all of the other devices through the information transmitting paths, and for forming the control command into a second transfer signal for transferring toward the designated device through the information transmitting paths; and a system control means for controlling, upon receiving the identity signal from the second demodulation means, the operation of the device on the basis of the device control signal of the signal unit; and the other devices each comprising:

a frame decode means for judging whether or not the transfer signal from the frame generating means of the device is a common command to output a signal indicating whether the command is common or special;

a first format counter conversion means for converting the transfer signal to the original signal unit, in a counter, upon receiving the special signal from the frame decode means;

a second format counter conversion means for judging whether or not the signal nit from the first format counter conversion means has a specific signal arrangement relating to each of the other devices to output a signal indicating the agreement or disagreement therebetween;

a format counter conversion means for neglecting, upon receiving the disagreement signal from the second format counter conversion means, the signal unit, and for judging, upon receiving the agreement signal from the second format counter conversion means, whether or not th signal unit is directed to each of the other devices to output a signal indicating the identity or non-identity thereof; and a system control means for neglecting, upon receiving the non-identity signal from the format counter conversion means, the signal unit, and for controlling, upon receiving the identity signal from one of the format counter conversion signal and the common signal from the frame decode means, the operation of the designated device on the basis of the device control signal of the signal unit.

6. A remote control system for controlling at least two electronic devices each connected with the other devices through information transmission paths and having an identifying address, at least more than two individual predetermined operating modes, and at least more than one operational actuator which is operable by an operator to transmit a remote control signal consisting of either an operational signal for controlling the operation of each of the devices or a designation signal for designating one of the identified devices to be controlled by the operational signal, each of the devices comprising:

a receiver for receiving the remote control signal;

a control means for controlling the operation of the device in connection with the predetermined mode upon receiving the signal from the receiver; and a communication means for transmitting the signal from the receiver to the other devices through the paths, said receiver including:

a first demodulation means having a specific signal arrangement stored therein, said specific signal arrangement being compared with the signal arrangement of the signal unit received by the receiver to output a signal indicating the agreement or disagreement therebetween, and for neglecting the signal unit in the case of outputting the disagreement signal;

a second demodulation means for judging, upon receiving the agreement signal from the first demodulation means, whether or not the device select signal of the signal unit is directed to the device having the receiver so as to output a signal indicating the identity or non-identity thereof;

a data code process means for judging, upon receiving the disagreement signal from the first demodulation means, whether or not the control command of the device control signal of the signal unit is a kind of command common to the other devices to output a signal indicating whether the command is common or special, and for neglecting the signal unit in the case of outputting the special signal;

a format converting means for converting, upon receiving the common signal from the data code process means, the signal unit for the transmitter to a control command for operating the designated device;

a frame generating means for forming the control command into a second transfer signal for transferring toward the designated device through the information transmitting paths; and a system control means for controlling, upon receiving the identity signal from the second demodulation means, the operation of the device on the basis of the device control signal of the signal unit; and the other devices each comprising:

a frame decode means for judging whether or not the transfer signal from the frame generating means of the device is a common command to output a signal indicating whether the command is common or special, and for neglecting the transfer signal in the case of outputting the special signal; and a system control means for controlling, upon receiving the common signal from the frame decode means, the operation of the designated device on the basis of the device control signal of the signal unit.

7. A remote control system for controlling at least two electronic devices each connected with the other devices through information transmission paths and having an identifying address, at least more than two individual predetermined operating modes, and at least more than one operational actuator which is operable by an operator to transmit a remote control signal consisting of either an operational signal for controlling the operation of each of the devices or a designation signal for designating one of the identified devices to be controlled by the operational signal, each of the devices comprising:

a receiver for receiving the remote control signal;

a control means for controlling the operation of the device in connection with the predetermined mode upon receiving the signal from the receiver; and a communication means for transmitting the signal from the receiver to the other devices through the paths, said receiver including:

a first demodulation means having a specific signal arrangement stored therein, said specific signal arrangement being compared with the signal arrangement of the signal unit received by the receiver to output a signal indicating the agreement or disagreement therebetween;

a second demodulation means for judging, upon receiving the agreement signal from the first demodulation means, whether or not the device select signal of the signal unit is directed to the device having the receiver so as to output a signal indicating the identity or non-identity thereof;

a first format converting means for converting the signal unit of the transmitter to an equivalent transfer signal for transferring through the information transmitting paths, upon receiving one of the disagreement signal from the first demodulation means and the non-identity signal from the second demodulation means;

a frame generating means for forming the equivalent transfer signal into a transfer signal for transferring toward all of the other devices through the information transmitting paths; and a system control means for controlling, upon receiving the identity signal from the second demodulation means, the operation of the device on the basis of the device control signal of the signal unit; and the other devices each comprising:

a first format counter conversion means for converting the transfer signal transmitted from the frame generating means to the original signal unit in a counter;

a second format counter conversion means for judging whether or not the signal unit from the first format counter conversion means has a specific signal arrangement relating to each of the other devices to output a signal indicating the agreement or disagreement therebetween;

a format counter conversion means for neglecting, upon receiving the disagreement signal from the second format counter conversion means, the signal unit, and for judging, upon receiving the agreement signal from the second format counter conversion means, whether or not the signal unit is directed to each of the other devices to output a signal indicating the identity or non-identity thereof; and a system control means for neglecting, upon receiving the non-identity signal from the format counter conversion means, the signal unit, and for controlling, upon receiving the identity signal from the format counter conversion signal, the operation of the designated device on the basis of the device control signal of the signal unit.

8. A remote control system for controlling at least two electronic devices each connected with the other devices through information transmission paths and having an identifying address, at least more than two individual predetermined operating modes, and at least more than one operational actuator which is operable by an operator to transmit a remote control signal consisting of either an operational signal for controlling the operation of each of the devices or a designation signal for designating one of the identified devices to be controlled by the operational signal, each of the devices comprising:

a receiver for receiving the remote control signal;
 a control means for controlling the operation of the device in connection with the predetermined mode upon receiving the signal from the receiver; and
 a communication means for transmitting the signal from the receiver to the other devices through the paths,
 said receiver including:
 a first demodulation means having a specific signal arrangement stored therein, said specific signal arrangement being compared with the signal arrangement of the signal unit received by the receiver to output a signal indicating the agreement or disagreement therebetween; and for neglecting the signal unit in the case of outputting the disagreement signal;
 a second demodulation means for judging, upon receiving the agreement signal from the first demodulation means, whether or not the device select signal of the signal unit is directed to the device having the receiver so as to output a signal indicating the identity or non-identity thereof;
 a format converting means for converting the signal unit of the transmitter to an equivalent transfer signal for transferring through the information transmitting paths, upon receiving the non-identity signal from the second demodulation means;
 a frame generating means for forming the equivalent transfer signal into a first transfer signal for to transferring toward all of the other devices through the information transmitting paths; and
 a system control means for controlling, upon receiving the identity signal from the second demodulation means, the operation of the device on the basis of the device control signal of the signal unit; and
the other devices each comprising:
 a format counter conversion means for converting the transfer signal transmitted from the frame generating means to the original signal unit in a counter;
 a format counter conversion means for judging, upon receiving the agreement signal from the second format counter conversion means, whether or not the signal unit from the format counter conversion means is directed to each of the other devices to output a signal indicating the identity or non-identity thereof; and
 a system control means for neglecting, upon receiving the non-identity signal from the format counter conversion means, the signal unit, and for controlling, upon receiving the identity signal from the format counter conversion signal, the operation of the designated device on the basis of the device control signal of the signal unit.

* * * * *